(12) United States Patent
Furukawa et al.

(10) Patent No.: US 10,871,365 B2
(45) Date of Patent: Dec. 22, 2020

(54) ANGLE DETECTION DEVICE AND ELECTRIC POWER STEERING APPARATUS

(71) Applicant: Mitsubishi Electric Corporation, Tokyo (JP)

(72) Inventors: Akira Furukawa, Tokyo (JP); Yu Kawano, Tokyo (JP); Yuji Takizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/748,228

(22) PCT Filed: May 31, 2016

(86) PCT No.: PCT/JP2016/065994
§ 371 (c)(1),
(2) Date: Jan. 29, 2018

(87) PCT Pub. No.: WO2017/090265
PCT Pub. Date: Jun. 1, 2017

(65) Prior Publication Data
US 2018/0252511 A1    Sep. 6, 2018

(30) Foreign Application Priority Data

Nov. 26, 2015   (WO) .................. PCT/JP2015/083229

(51) Int. Cl.
*G01B 7/30*       (2006.01)
*G01D 5/14*       (2006.01)
(Continued)

(52) U.S. Cl.
CPC ............. *G01B 7/30* (2013.01); *B62D 5/0463* (2013.01); *B62D 6/10* (2013.01); *G01D 5/145* (2013.01); *H02P 6/10* (2013.01); *H02P 6/16* (2013.01)

(58) Field of Classification Search
CPC .... B62D 5/0463; B62D 5/049; B62D 15/021; G01B 7/30; G01B 21/045; G01D 5/145;
(Continued)

(56) References Cited

U.S. PATENT DOCUMENTS 6,479,987 B1 * 11/2002 Marx ....................... G01B 7/30
324/207.12
6,622,391 B1    9/2003 Shirai et al.
(Continued)

FOREIGN PATENT DOCUMENTS

CN       102072698 A    5/2011
CN       103946673 A    7/2014
(Continued)

OTHER PUBLICATIONS

International Search Report of PCT/JP2016/065994 dated Aug. 30, 2016 [PCT/ISA/210].
(Continued)

*Primary Examiner* — Thai T Dinh
(74) *Attorney, Agent, or Firm* — Sughrue Mion, PLLC; Richard C. Turner

(57) ABSTRACT

Included are: a sensor magnet which rotates integrally with a rotating shaft centering on the rotating shaft, and generates a magnetic field for angle detection which is for detecting the angle of rotation; a first sensor and a second sensor each of which is arranged opposite to the sensor magnet at a position separated in angle by 90 degrees on the circumference centered on the rotating shaft, and outputs a signal corresponding to the magnetic field for angle detection; and an angle calculator that calculates a rotation angle by using the signals from the first sensor and the second sensor.

16 Claims, 17 Drawing Sheets

(51) Int. Cl.
  *B62D 5/04*   (2006.01)
  *B62D 6/10*   (2006.01)
  *H02P 6/10*   (2006.01)
  *H02P 6/16*   (2016.01)

(58) Field of Classification Search
  CPC .... G01D 5/24471; G01D 5/2448; H02P 6/16; H02P 29/50; H02P 6/10
  See application file for complete search history.

(56) References Cited

U.S. PATENT DOCUMENTS

| | | | |
|---|---|---|---|
| 7,394,247 B1 | 7/2008 | Guo et al. | |
| 7,923,993 B2* | 4/2011 | Takahashi | F16C 41/007 |
| | | | 324/207.25 |
| 8,729,890 B2* | 5/2014 | Donovan | G01R 33/0029 |
| | | | 324/207.25 |
| 10,359,478 B2* | 7/2019 | Onaka | G01R 33/07 |
| 10,690,514 B2* | 6/2020 | Kuwahara | G01D 5/244 |
| 2006/0028203 A1* | 2/2006 | Kawashima | G01D 5/145 |
| | | | 324/207.25 |
| 2009/0115409 A1* | 5/2009 | Arinaga | G01D 5/145 |
| | | | 324/207.25 |
| 2010/0045271 A1* | 2/2010 | Tanaka | G01D 5/145 |
| | | | 324/207.13 |
| 2011/0031965 A1* | 2/2011 | Saruki | G01D 3/036 |
| | | | 324/207.25 |
| 2011/0115477 A1 | 5/2011 | Suzuki | |
| 2012/0095712 A1* | 4/2012 | Komasaki | G01D 3/036 |
| | | | 702/94 |
| 2012/0286773 A1* | 11/2012 | Reymond | G01R 33/077 |
| | | | 324/207.2 |
| 2013/0238278 A1* | 9/2013 | Shoemaker | G01D 5/145 |
| | | | 702/145 |
| 2014/0225596 A1 | 8/2014 | Nakamura et al. | |
| 2014/0336878 A1 | 11/2014 | Yanai et al. | |
| 2015/0022192 A1 | 1/2015 | Ausserlechner | |
| 2015/0204696 A1 | 7/2015 | Hirota et al. | |
| 2015/0239496 A1* | 8/2015 | Kozawa | B62D 5/0463 |
| | | | 702/151 |
| 2015/0239501 A1* | 8/2015 | Fujita | B62D 5/0481 |
| | | | 701/41 |
| 2016/0334242 A1 | 11/2016 | Ausserlechner | |

FOREIGN PATENT DOCUMENTS

| | | |
|---|---|---|
| CN | 104296650 A | 1/2015 |
| EP | 2333492 A1 | 6/2011 |
| EP | 2784450 A1 | 10/2014 |
| JP | 2529960 B2 | 9/1996 |
| JP | 2001-012967 A | 1/2001 |
| JP | 2002-506530 A | 2/2002 |
| JP | 2006-170837 A | 6/2006 |
| JP | 2007-263585 A | 10/2007 |
| JP | 2007-271443 A | 10/2007 |
| JP | 2007271443 A * | 10/2007 |
| JP | 2009-031292 A | 2/2009 |
| JP | 2010-078366 A | 4/2010 |
| JP | 2011-038855 A | 2/2011 |
| JP | 2013-007731 A | 1/2013 |

OTHER PUBLICATIONS

Office Action dated Jul. 26, 2019 by the China National Intellectual Property Administration in Patent Application No. 201680067664.7.
Communication dated May 22, 2019, from the European Patent Office in counterpart European Application No. 16868216.9.
Communication dated Jul. 23, 2019, from the Japanese Patent Office in counterpart Japanese Application No. 2017-552280.
Communication dated Mar. 3, 2020, from the Japanese Patent Office in Application No. 2017-552280.
Communication dated Mar. 17, 2020 by The State Intellectual Property Office of the P.R. of China in application No. 201680067664.7.
Communication dated Sep. 10, 2020 from the China National Intellectual Property Administration in Application No. 201680067664.7.

\* cited by examiner

ANGLE DETECTION DEVICE AND ELECTRIC POWER STEERING APPARATUS

CROSS REFERENCE TO RELATED APPLICATIONS

This application is a National Stage of International Application No. PCT/JP2016/065994, filed May 31, 2016, claiming priority based on WIPO Patent Application No. PCT/JP2015/083229, filed Nov. 26, 2015, the contents of all of which are incorporated herein by reference in their entirety.

TECHNICAL FIELD

The present invention relates to an angle detection device and an electric power steering apparatus using the same.

BACKGROUND ART

As a conventional angle detection device, there is one which is configured such that a sensor magnet is arranged at a rotating shaft end and a magnetoresistive semiconductor sensor is arranged opposite to the sensor magnet in the axis direction of the rotating shaft (for example, see Patent Document 1).

PRIOR ART DOCUMENT

Patent Document

Patent Document 1: JP-A-2013-7731

SUMMARY OF THE INVENTION

Problems to be Solved by the Invention

The conventional angle detection device shown in Patent Document 1, which detects the angle of rotation, is structured such that the sensor magnet is arranged at the rotating shaft end and the magnetoresistive semiconductor sensor is arranged opposite to the sensor magnet in the axis direction of the rotating shaft. In the angle detection position using the semiconductor sensor (rotation sensor) such as this, the magnitude of a magnetic field of the sensor magnet is constant and a rotating magnetic field in which distortion of a spatial magnetic field is small can be obtained. The magnetoresistive semiconductor sensor increases a changing rate of electrical resistance by a bias magnetic field and detects the angle of rotation by the direction of the magnetic field. Therefore, as shown in Patent Document 1, since the configuration which detects the angle by using the sensor magnet and the semiconductor sensor at the rotating shaft end portion can actualize higher angle detection accuracy by the rotating magnetic field which is constant in magnitude and small in distortion, the configuration is general and appropriate as a method of detecting the angle.

However, the angle detection device configured to detect the angle at the rotating shaft end portion such as this has a problem in that axial dimension increases to become a large size.

On the other hand, in the case where the sensor magnet is arranged around the rotating shaft and the magnetoresistive semiconductor sensor is arranged around the sensor magnet, a problem exists in that the distortion of the spatial magnetic field increases and the angle detection accuracy deteriorates.

The present invention has been made to solve the foregoing problem and is to provide an angle detection device capable of enhancing the accuracy of angle detection without enlarging structure.

Means for Solving the Problems

There is provided an angle detection device including: a sensor magnet which rotates integrally with a rotating shaft centering on the rotating shaft, and generates a magnetic field for angle detection which for detecting the angle of rotation; a first sensor and a second sensor each of which is arranged at a position separated in angle by 90 [deg] (degrees, the same as described hereinafter) on the circumference centered on the rotating shaft, and outputs a signal corresponding to the magnetic field for angle detection; and an angle calculator which calculates a rotation angle by using the signals from the first sensor and the second sensor.

Advantageous Effect of the Invention

In the angle detection device of the present invention, the sensors each of which is arranged at the position separated is angle by 90 [deg] and outputs the signal corresponding to the magnetic field for angle detection, whereby the device is not enlarged and a higher harmonic component of the magnetic field which is distortion of a spatial magnetic field and a higher harmonic component of output voltage which is caused thereby can be reduced; and therefore, angle detection accuracy can be enhanced.

MODE FOR CARRYING OUT THE INVENTION

Figure 1:
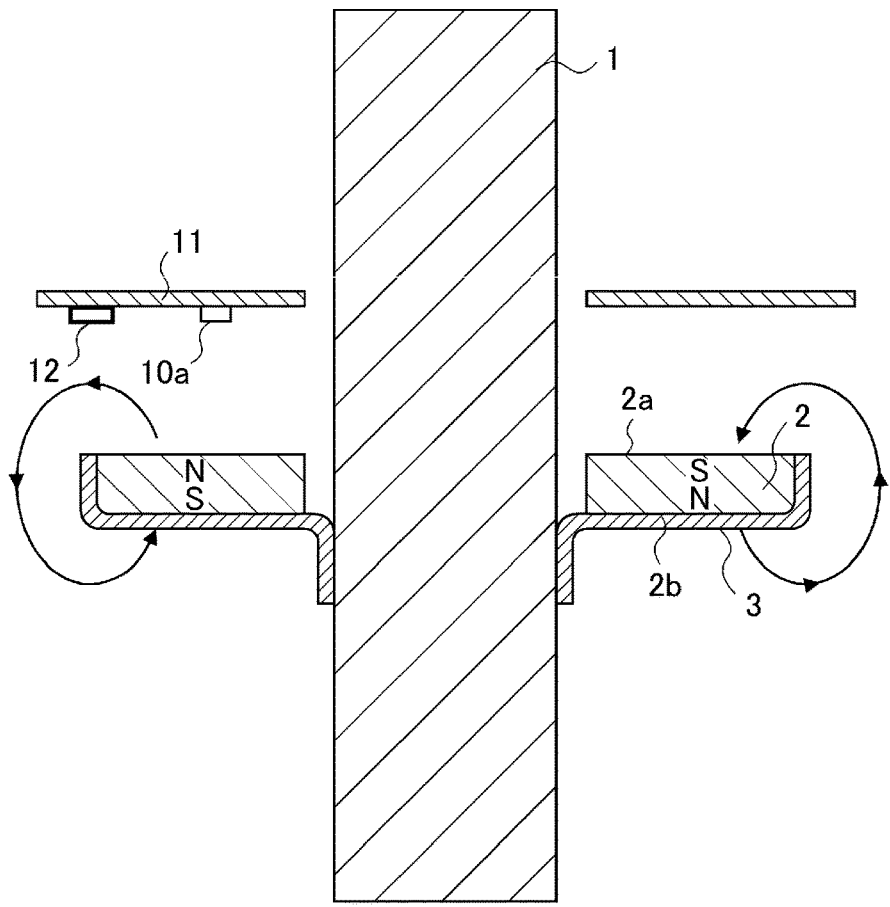
FIG. 1 is a sectional view showing the relative position between a sensor magnet and a sensor in an angle detection device according to Embodiment 1 of the present invention.

Hereinafter, respective embodiments of an angle detection device in the present invention will be described on the basis of drawings. Then, in each of the drawings, identical or equivalent members and portions will be described with the same reference numerals (and letters) assigned thereto.

Embodiment 1

FIG. 1 is a sectional view showing the configuration of an angle detection device according to Embodiment 1.

A sensor magnet 2 and a holder 3 that fixes the sensor magnet 2 are fixed integrally with a rotating shaft 1 on a circumferential portion of the rotating shaft 1 of a permanent magnet motor.

The sensor magnet 2 is, for example, an injection molding neodymium bond magnet and is formed in a ring shape integrally with the holder 3 The sensor magnet 2 is commonly called as four pole magnetization on both surfaces; each half of an axial upper surface 2a is magnetized to an N pole and an S pole; and each half of an axial lower surface 2b is magnetized to a magnetic pole opposite to that of the upper surface 2a. More specifically, a magnetic field produced by the sensor magnet 2 becomes the distribution of the magnetic field which flows in the axial direction from the N pole and from the axial direction to the S pole like arrows. Here, description will be made on those that are axially magnetized; however, similar action and effect can be obtained even those that are magnetized in different directions such as a radial direction.

The sensor magnet 2 is fixed integrally to the rotating shaft 1 by press-fitting or the like via the holder 3 made of a non-magnetic material or a magnetic material and rotates in synchronization with the rotation of the rotating shaft 1. In order to reduce a leakage magnetic flux of the magnetic material to the rotating shaft 1, the inner circumference of the sensor magnet 2 is arranged apart from the outer circumference of the rotating shaft 1.

A sensor 10a serving as a magnetoresistive semiconductor sensor and a substrate 11 that mounts the sensor are arranged opposite to the upper surface 2a of the sensor magnet 2. Other electronic components, wiring patterns, attachment holes and the like, which constitute the angle detection device, are omitted and only a relevant part is shown in the drawing.

The sensor 10a detects a rotating magnetic field direction in a parallel direction to a flat surface perpendicular to the rotating shaft 1, more specifically, the substrate 11. A plurality of bridges that detect the rotating magnetic field direction are incorporated inside the sensor 10a; and there is one set or two sets of a pair of bridges whose detection directions are different by 90 [deg] with respect to the rotating magnetic field direction.

A central processing unit (CPU) 12 calculates a rotation angle on the basis of signals obtained by the sensor 10a. For example, when the angle detection device of the present embodiment is mounted on an alternating current (AC) rotary machine such as a brush-less motor, control is performed on the basis of the rotation angle.

Figure 2:
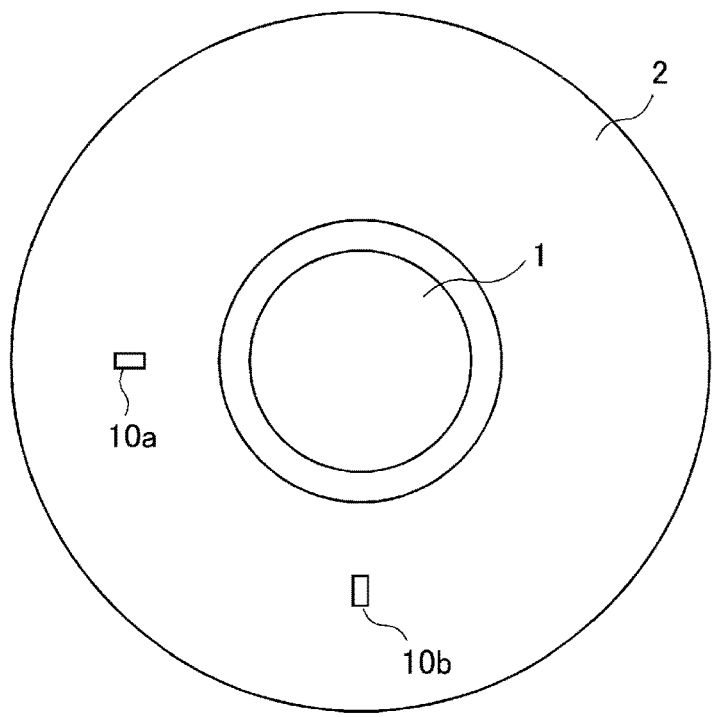
FIG. 2 is an explanation view showing an arrangement relationship of sensors is the angle detection device according to Embodiment 1 of the present invention.

The sensor is composed of the sensor 10a and a sensor 10b which are arranged on the substrate 11 at positions separated by 90 [deg] at the same radius with respect to the rotating shaft 1, as shown in FIG. 2. The configuration of the sensor 10b is the same as the above-mentioned sensor 10a. Incidentally, FIG. 2 shows the drawing in which the holder 3, the substrate 11, and the CPU are omitted.

Figure 3:
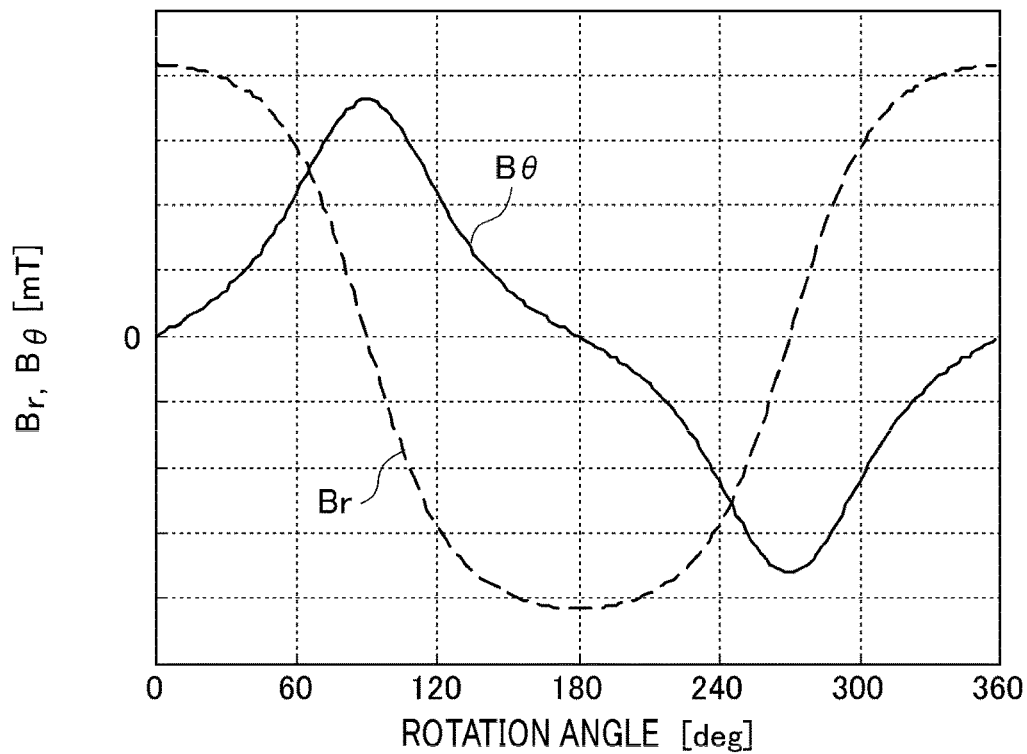
FIG. 3 is an explanation view showing a change in the magnitude and direction of a magnetic field at a sensor position in the angle detection device according to Embodiment 1 of the present invention.

FIG. 3 shows a change in the magnitude and direction of the rotating magnetic field direction at the position of the sensor 10a at the time when the rotating shaft 1 rotates one time. A radial direction component is represented as Br and a circumferential direction component is represented as Bθ. Here, in the case of general detection at the end portion, the magnitude of the magnetic field is constant and distortion of a spatial magnetic field is small; and thus, the change becomes a 1st order sine wave form. However, in the case of detection on the outer circumference, the change becomes the distribution of a spatial magnetic field in which an odd order higher harmonic component is superimposed on the sine wave.

For example, description will be made on the case where the sensor is such that the sensor 10a outputs the radial direction component Br as a cosine signal Vcos1 and outputs the circumferential direction component Bθ as a sine signal Vsin1; and the sensor 10b outputs the radial direction component Br as a cosine signal Vcos2 and outputs the circumferential direction component Bθ as a sine signal Vsin2. Incidentally, in the following description, the sine signal Vsin may also be represented by using only Vsin; and the cosine signal Vcos may also be represented by using only Vcos.

Figure 4:
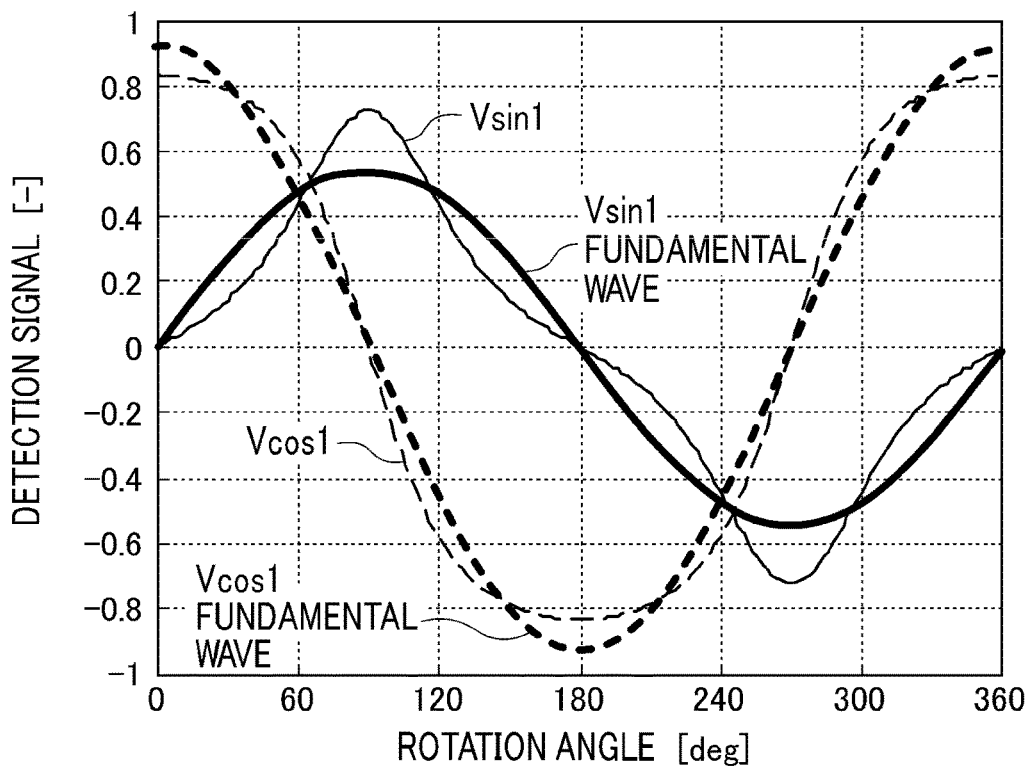
FIG. 4 is an explanation view showing output signals of the sensor in the angle detection device according to Embodiment 1 of the present invention.

FIG. 4 shows output signals of the sensor 10a by using a horizontal axis as a rotation angle.

In the cosine signal Vcos1, amplitude of a fundamental wave (thick dashed line shown in FIG. 4) is larger than that of the signal (thin dashed line shown in FIG. 4); and in the sine signal Vsin1, amplitude of a fundamental wave (thick solid line shown in FIG. 4) is smaller than that of the signal (thin solid line shown in FIG. 4). When the fundamental waves are compared, a large difference is present between the amplitude of the fundamental wave Vcos1 and that of Vsin1. In other words, since the amplitude ratio of the fundamental waves is not 1, it appears as a 2nd order angle error. Furthermore, the difference between the original signal and the fundamental wave is an error signal; however, the magnitude relationship between the fundamental wave and the original signal shows that the signal error is large in a 3rd order component because the magnitude relationship is switched three times per one rotation. Furthermore, a 3rd order component included in Vcos1 is more advanced in phase by nearly 90 [deg] than a 3rd order component included in Vsin1 and each 3rd order component has almost the same amplitude; and thus, this also appears as a 2nd order angle error. More specifically, in this case, it becomes a nearly 2nd order angle error, like FIG. 5.

Figure 6:
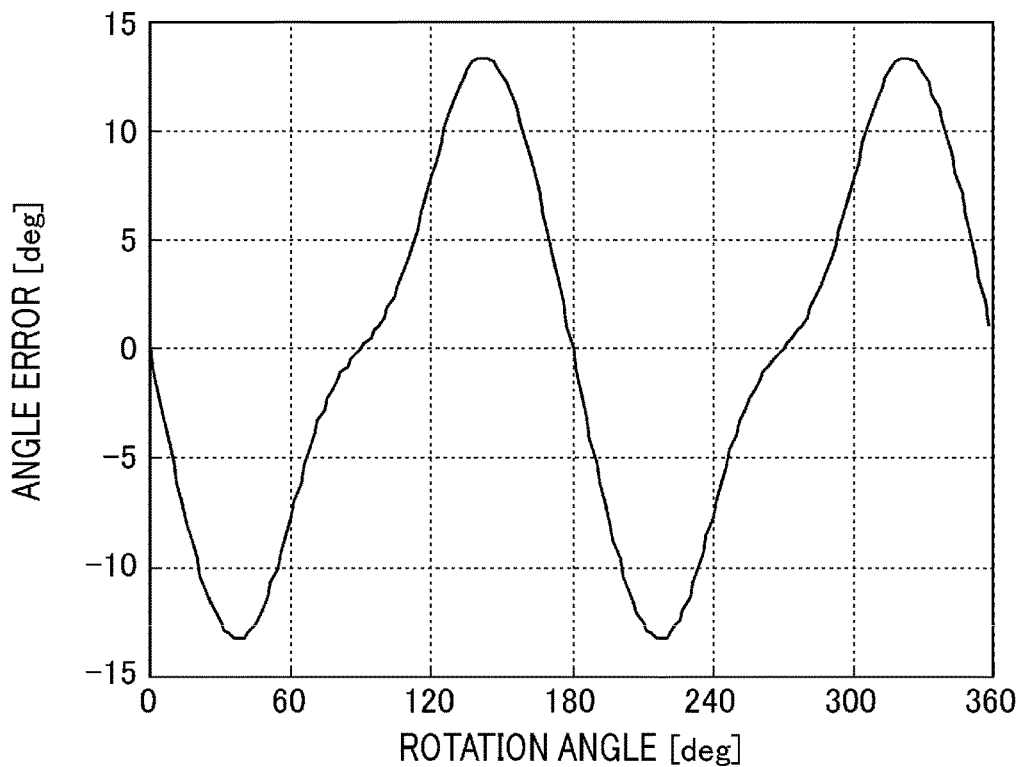
FIG. 6 is an explanation view for explaining an angle error in the detection signals detected by the sensor.

The 2nd order angle error caused by the existing difference in the amplitude of the fundamental waves can be reduced by correcting the amplitude. In the angle error in the case where the angle is calculated by using one in which the amplitude ratio of the amplitude of the fundamental waves and Vsin1 are multiplied together and Vcos1, a 4th order error other than the 2nd order also appears largely, like FIG. 6. This is caused by generating deviation in the amplitude ratio of 3rd or higher order higher harmonic components because the original signal and gain are multiplied together in accordance with the amplitude ratio of the fundamental waves.

Figure 7:
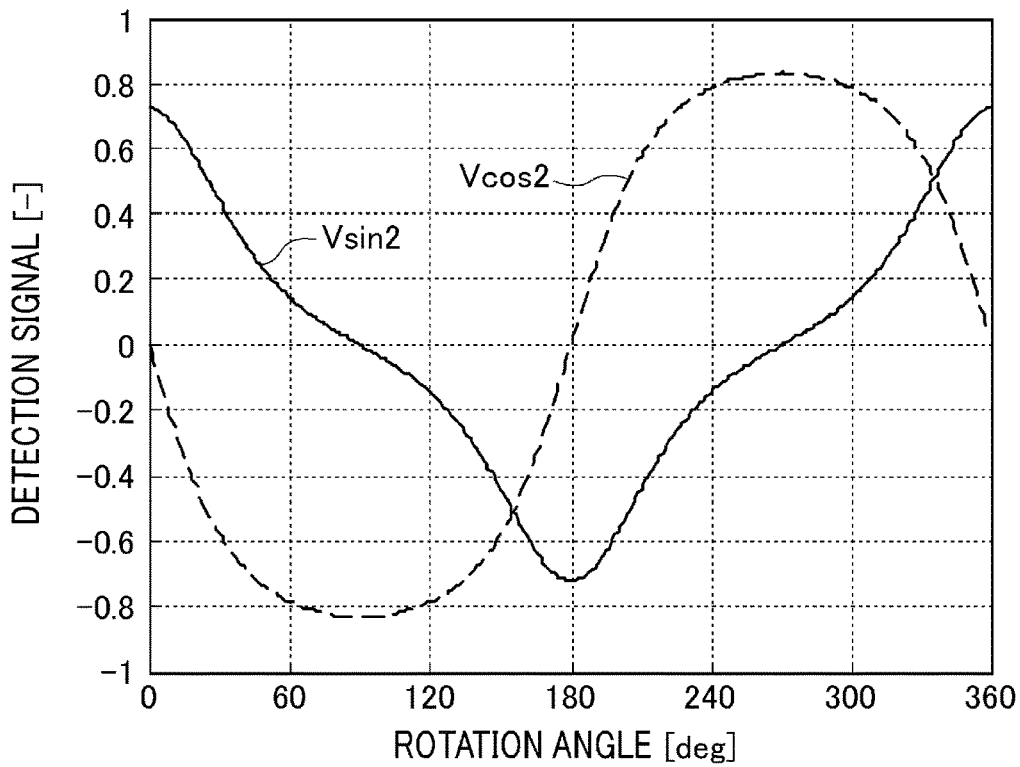
FIG. 7 is an explanation view for explaining detection signals detected by a sensor.

On the other hand, since the sensor 10b is located at the position advanced in phase by 90 [deg] with respect to the sensor 10a, Vcos2 and Vsin2 are advanced in phase by 90 [deg] with respect to Vcos1 and Vsin1 of FIG. 4, respectively, like FIG. 7. At this time, an error included in an angle calculated from Vcos2 and Vsin2 becomes a nearly 2nd order angle error, like FIG. 8.

Figure 5:
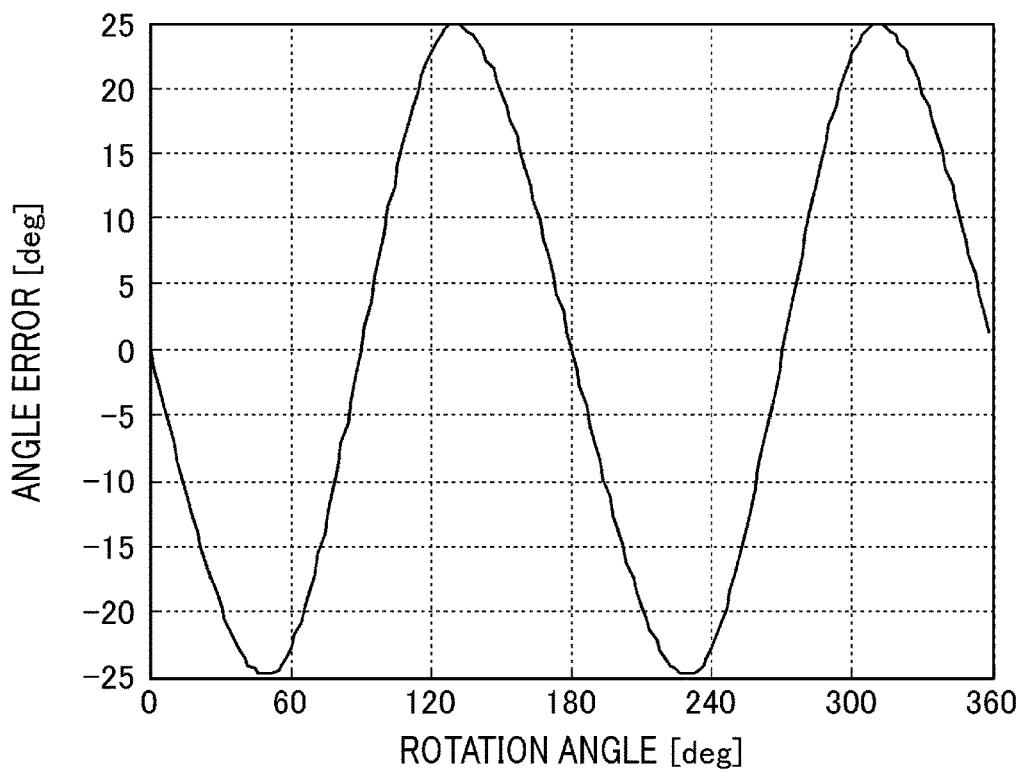
FIG. 5 is an explanation view for explaining an angle error is detection signals detected by the sensor.
Figure 8:
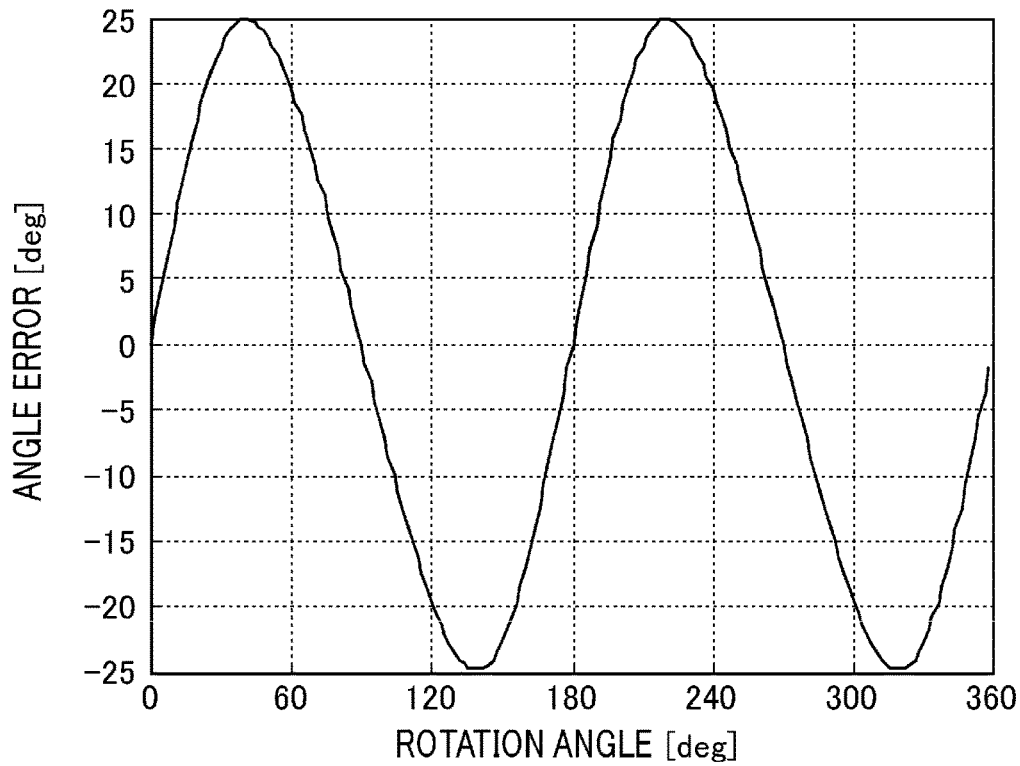
FIG. 8 is an explanation view for explaining an angle error in detection signals detected by the sensor.
Figure 9:
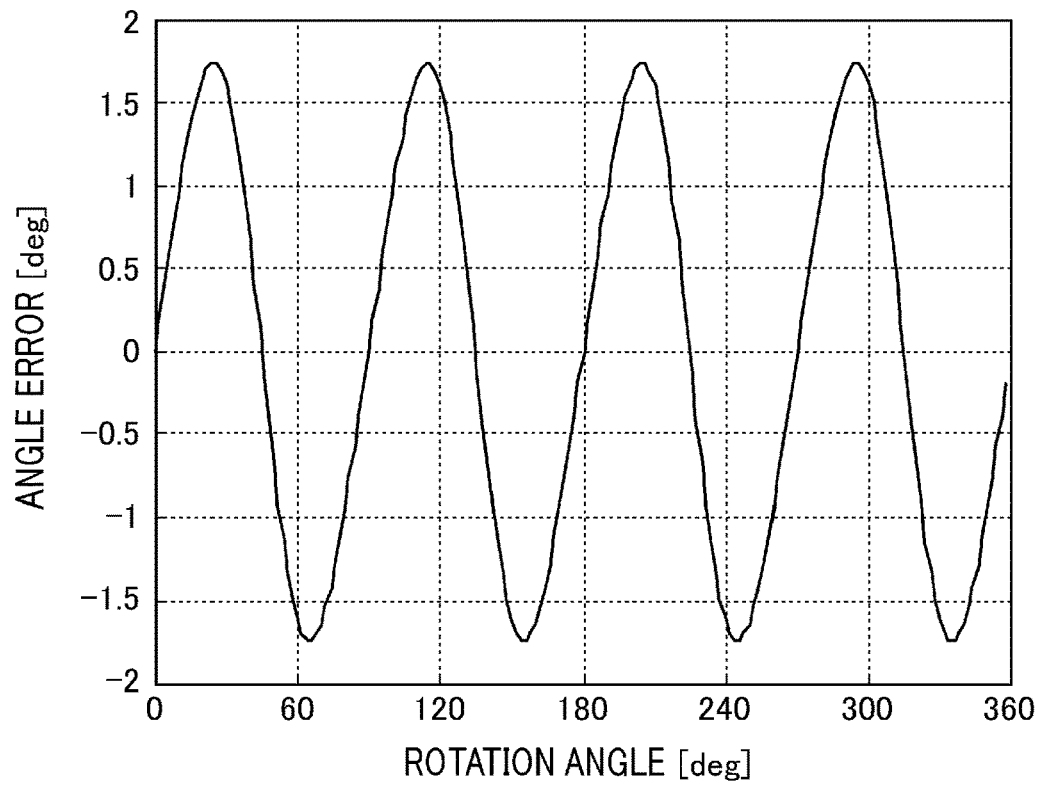
FIG. 9 is an explanation view for explaining as angle error in detection signals detected by the sensors.

When FIG. 5 is compared with FIG. 8, as shown in FIG. 8, phases of the largest 2nd order angle errors are different by 180 [deg]; and the 2nd order angle error can be reduced by taking an average of the angle obtained by the sensor 10a and the angle obtained by the sensor 10b. In other words, it becomes mainly a 4th order angle error in which a (4n−2)th order component (where, n is a natural number) like FIG. 9 is reduced to nearly zero, and the angle error can be reduced to a sufficiently small value with respect to the angle error in the case where each of the sensor 10a or the sensor 10b is used alone.

Figure 10:
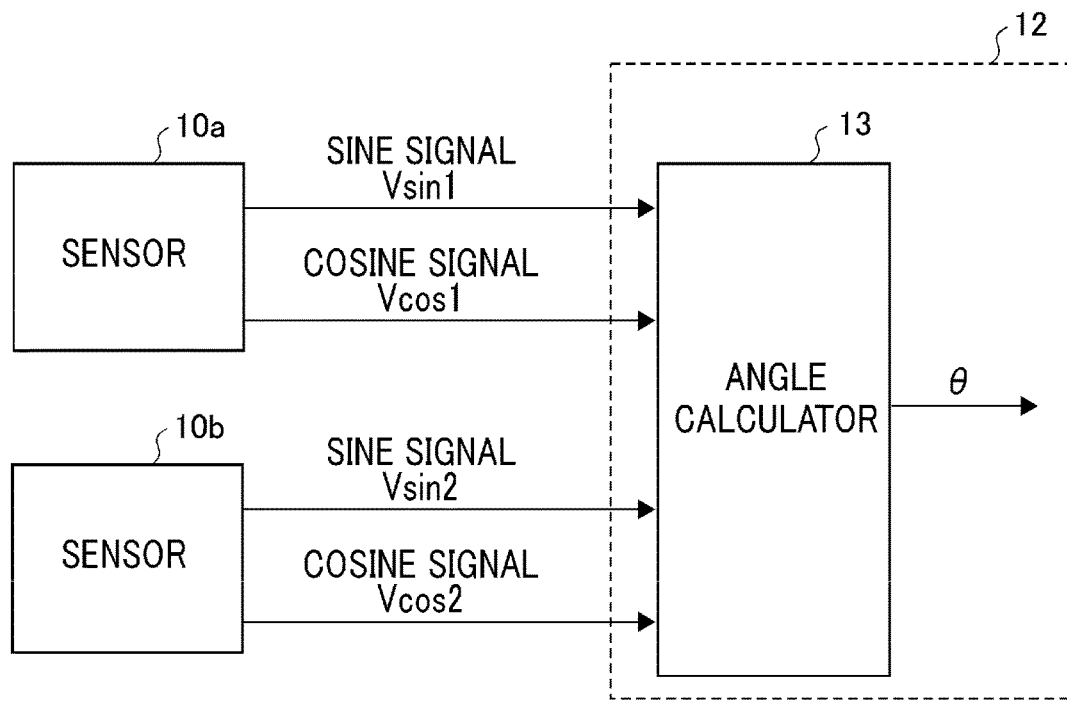
FIG. 10 is a block diagram showing the angle detection device in Embodiment 1 of the present invention.

FIG. 10 is block diagram showing the configuration of the angle detection device in the present embodiment 1. The sensor 10a outputs the radial direction component Br as the cosine signal Vcos1 and outputs the circumferential direction component Bθ as the sine signal Vsin1; and the sensor 10b outputs the radial direction component Br as the cosine signal Vcos2 and outputs the circumferential direction component Bθ as the sine signal Vsin2. The angle calculator 13 in the CPU 12 calculates a rotation angle θ on the basis of the signals obtained from the sensor 10a and the sensor 10b.

For example, calculation may be performed in the following procedure. A rotation angle θ1 is calculated from Vcos1 and Vsin1, like a formula (1).

Formula 1

$$\theta_1 = \tan^{-1}\left(\frac{V_{sin1}}{V_{cos1}}\right) \quad (1)$$

A rotation angle θ2 is calculated from Vcos2 and Vsin2, like a formula (2).

Formula 2

$$\theta_2 = \tan^{-1}\left(\frac{V_{sin2}}{V_{cos2}}\right) \quad (2)$$

The rotation angle θ is calculated from the rotation angle θ1 and the rotation angle θ2, like a formula (3).

Formula 3

$$\theta = \frac{\theta_1 + \theta_2}{2} \quad (3)$$

Here, a simple arc tangent function is used as the calculation formula of the rotation angle θ1 and the rotation angle θ2; however, calculation may be performed by using a previously defined conversion table. Furthermore, in the case where an error such as an offset error is included in each signal, those corrected by the known method can be used.

Figure 11:
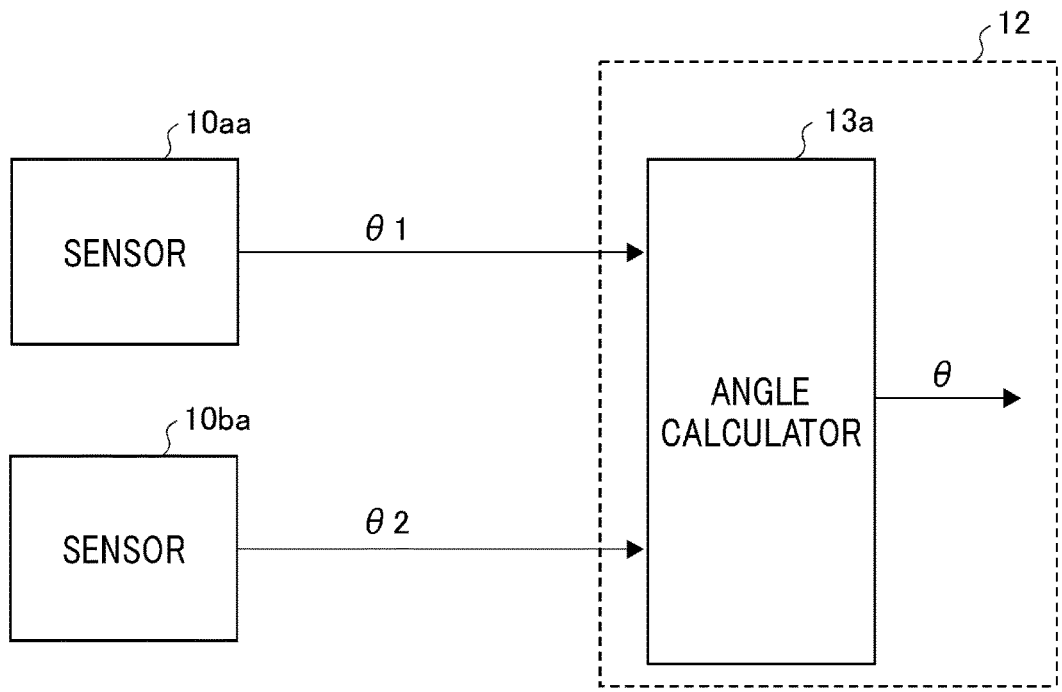
FIG. 11 is a block diagram showing a modified example of an angle detection device in Embodiment 1 of the present invention.

Incidentally, even a sensor outputs an angle without outputting a sine signal and a cosine signal, if the sensor detects the angle by magnetic resistance, it may be configured such that a sensor 10aa that detects a rotation angle θ1 and a sensor 10ba that detects a rotation angle θ2 are provided, like FIG. 11; and similar effects are obtained by calculating the rotation angle θ like the formula (3) by an angle calculator 13a.

Figure 12:
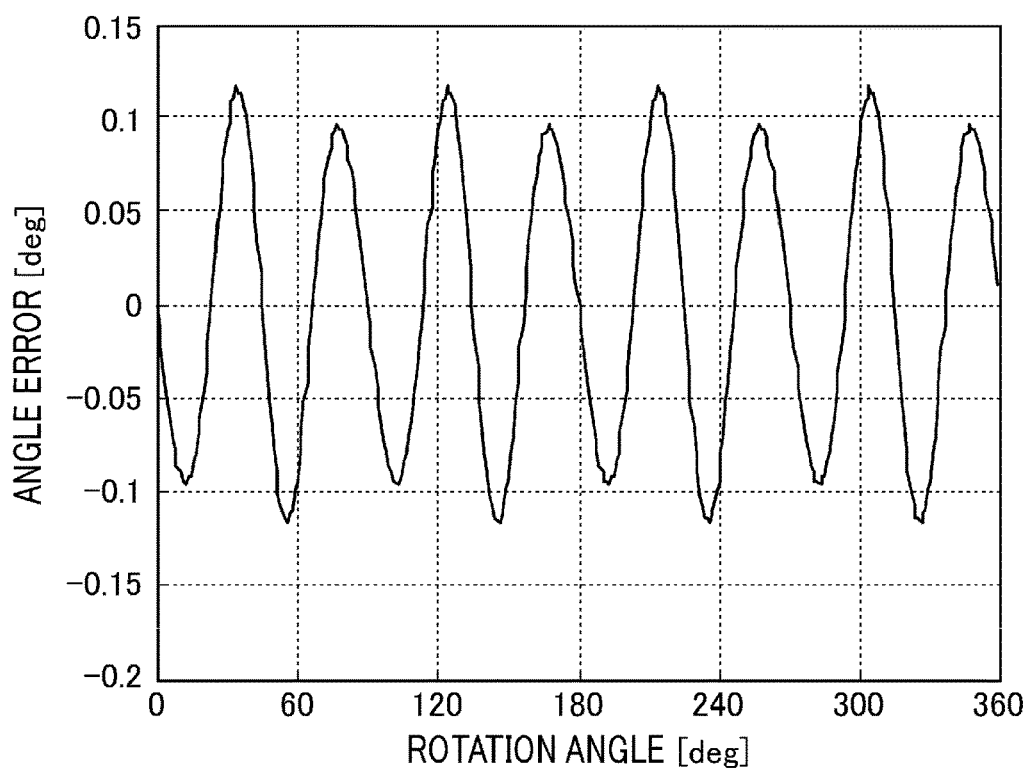
FIG. 12 is an explanation view for explaining an angle error of sensors in an angle detection device of Embodiment 1 of the present invention.

Further, an angle calculator (not shown in the drawing, for the sake of simplicity, also referred to as an angle calculator 13b) which calculates a rotation angle θ' after one time correction by a formula (4) by applying correction to the above rotation angle θ may be provided. Since the rotation angle θ obtained by the formula (3) is used, an error is superimposed as compared to the case where a correction quantity is determined by an angle true value; however, since it is used to the correction formula in a state where the angle error can be reduced like FIG. 9, the error included in the rotation angle θ and correction coefficients k4 and k8 are minute; and thus, an expected effect can be obtained. The angle error included in the rotation angle θ' after one time correction obtained by the angle calculator 13b can be reduced to be minute like FIG. 12. Here, the correction formula is such that the initial phase is set to 0 [deg]; however, a correction formula in which the initial phase is included according to an actual error component may be used.

Formula 4

$$\theta' = \theta - k_4 \sin 4\theta + k_8 \sin 8\theta \quad (4)$$

Figure 13:
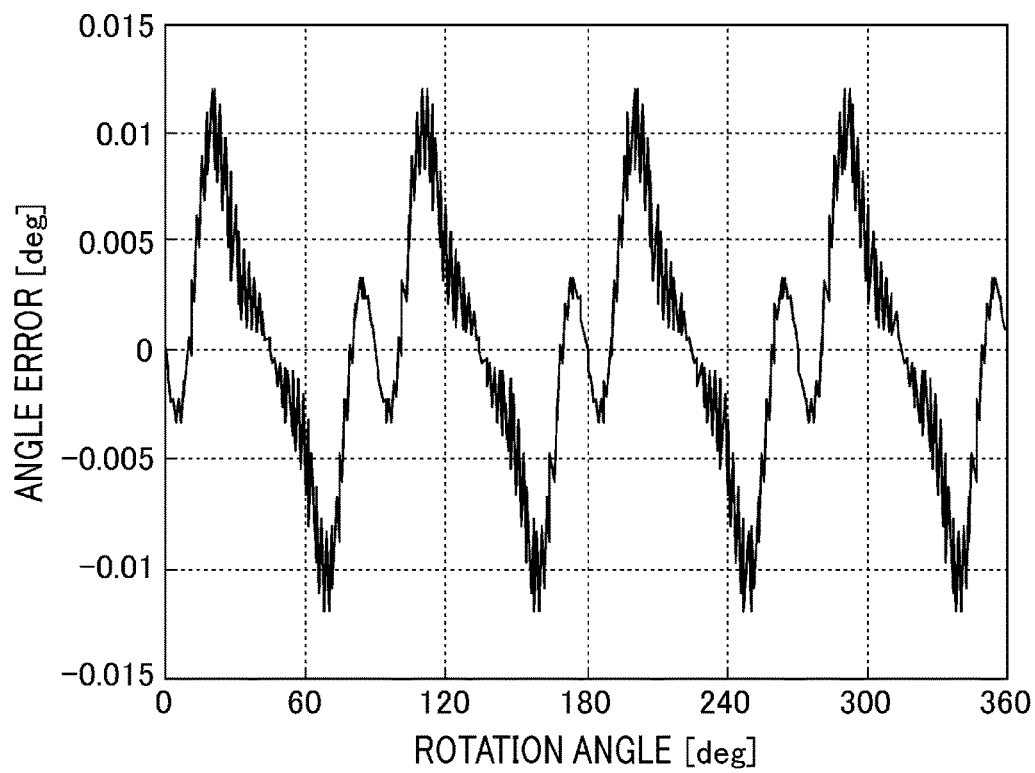
FIG. 13 is an explanation view for explaining an angle error of the sensors in the angle detection device of Embodiment 1 of the present invention.

Further, in the case where the expected accuracy cannot be obtained even the rotation angle θ' after one time correction which is corrected by the formula (4), a rotation angle θ'' after two time correction may be calculated on the basis of a formula (5) by using the rotation angle θ' after one time correction. An angle error included in the rotation angle θ'' after two time correction can be reduced to be more minute like FIG. 13. Here, two time correction is implemented; however, in the case where the original error is large, a higher order error component increases. However, a larger number of corrections may be implemented for a reduction of an order component of the maximum amplitude.

Formula 5

$$\theta'' = \theta - k_4 \sin 4\theta' + k_8 \sin 8\theta'' \quad (5)$$

Incidentally, the correction formula against the 4th order and 8th order components is used; however, a correction formula against a 4nth order component (where, n is a natural number) that includes a further higher order component may be used. Furthermore, since the 8th order component and the further higher order component are smaller as compared to the 4th order component, a formula that corrects the 4th order component may be used. It is to be understood that similar effects can be obtained even when the correction formula is not used, but a table of the rotation angle and the angle error is used.

Incidentally, a (2q−1)th order signal error is often superimposed in Vcos1, Vsin1, Vcos2, and Vsin2; and thus, in the case of calculating the rotation angle θ1 or the rotation angle θ2, those in which their order component errors are corrected may be used. Since the signal error is settled by the rotation angle, the correction quantity can be determined on the basis of the rotation angle; however, the rotation angle is calculated from the signals and accordingly the rotation angle cannot be calculated at the time when the signals are corrected. A change quantity from the previously calculated rotation angle is small in a low rotation area and thus the signal error correction quantity may be determined by using a previous rotation angle value. In the case of correcting the higher order component, deviation from the expected signal error correction quantity becomes large in a high rotation area and thus the signal error correction quantity may be determined by using an estimated rotation angle based on the previous rotation angle value, the number of rotations, and the change quantity from the previously calculated rotation angle.

In the present embodiment, there include: the sensor magnet which rotates integrally with the rotating shaft centering on the rotating shaft, and generates the magnetic field for angle detection which is for detecting the angle of rotation; the first sensor and the second sensor each of which is arranged at the position separated in angle by 90 [deg] on the circumference centered on the rotating shaft, and outputs the signal corresponding to the magnetic field for angle detection; and the angle calculator which calculates the rotation angle by using the signals from the first sensor and the second sensor. Furthermore, the signals outputted by the first sensor and the second sensor according to the magnetic field for angle detection are the angles and the angle calculator sets the average of the angle outputted by the first sensor and the angle outputted by the second sensor as the rotation angle. Moreover, the signals outputted by the first sensor and the second sensor according to the magnetic field for angle detection are the sine signal and the cosine signal; and the angle calculator sets the average of the angle calculated from the sine signal and the cosine signal which are outputted by the first sensor and the angle calculated from the sine signal and the cosine signal which are outputted by the second sensor as the rotation angle.

Embodiment 2

In the present embodiment 2, an angle calculator (not shown in the drawing, for the sake of simplicity, also referred to as an angle calculator 13c) which calculates a rotation angle θ on the basis of a formula (6) and a formula (7) is used instead of the angle calculator 13 in the block diagram of FIG. 10 showing Embodiment 1.

A cosine signal Vcos1 and a sine signal Vsin1 outputted by a sensor 10a can be expressed like the formula (7) if approximated. Here, an and do (where, n is a natural number) are a positive or zero value.

Formula 6

$$\begin{cases} V_{cos1} = a_1\cos\theta - a_3\cos3\theta + a_5\cos5\theta - a_7\cos7\theta + \ldots \\ V_{sin1} = d_1\sin\theta - d_3\sin3\theta + d_5\sin5\theta - d_7\sin7\theta + \ldots \end{cases} \quad (6)$$

On the other hand, a cosine signal Vcos2 and a sine signal Vsin2 outputted by a sensor 10b can be expressed like the formula (7), if approximated.

Formula 7

$$\begin{cases} V_{cos2} = -a_1\sin\theta - a_3\sin3\theta - a_5\sin5\theta - a_7\sin7\theta + \ldots \\ V_{sin2} = d_1\cos\theta + d_3\cos3\theta + d_5\cos5\theta + d_7\cos7\theta + \ldots \end{cases} \quad (7)$$

In other words, in the case of calculating a detection angle by an arc tangent function, Vsin2 can be used instead of Vcos1 as the cosine signal; and −Vcos2 can be used instead of Vsin1 as the sine signal.

Figure 14:
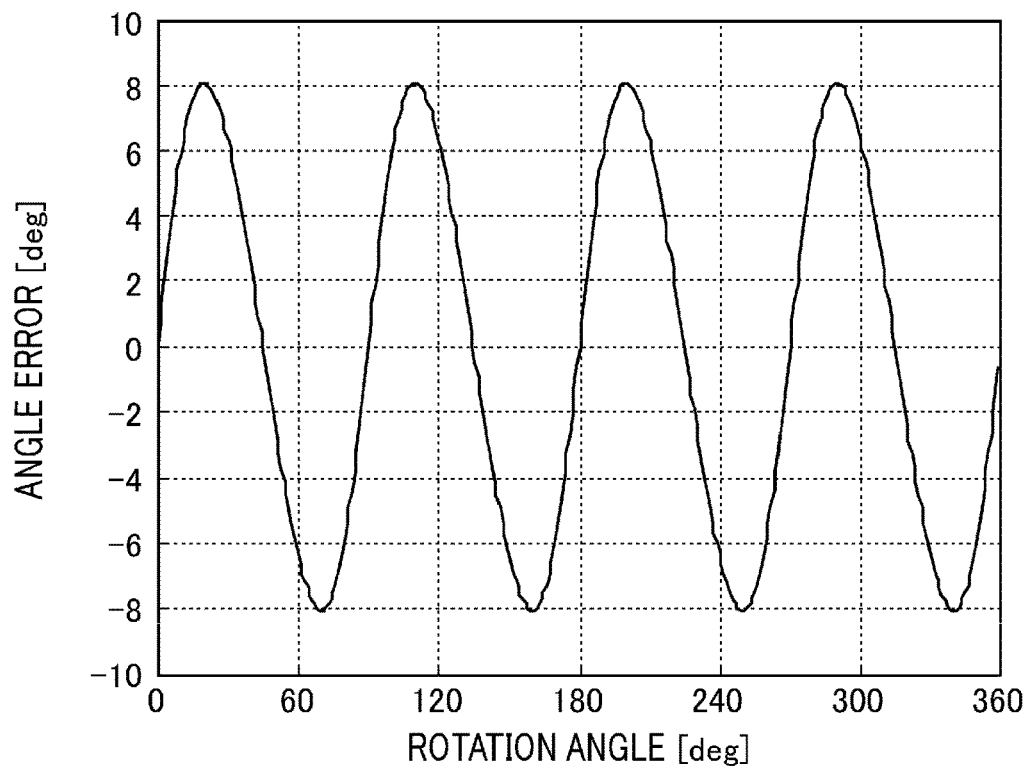
FIG. 14 is an explanation view for explaining an angle error of a sensor in an angle detection device of Embodiment 2 of the present invention.
Figure 15:
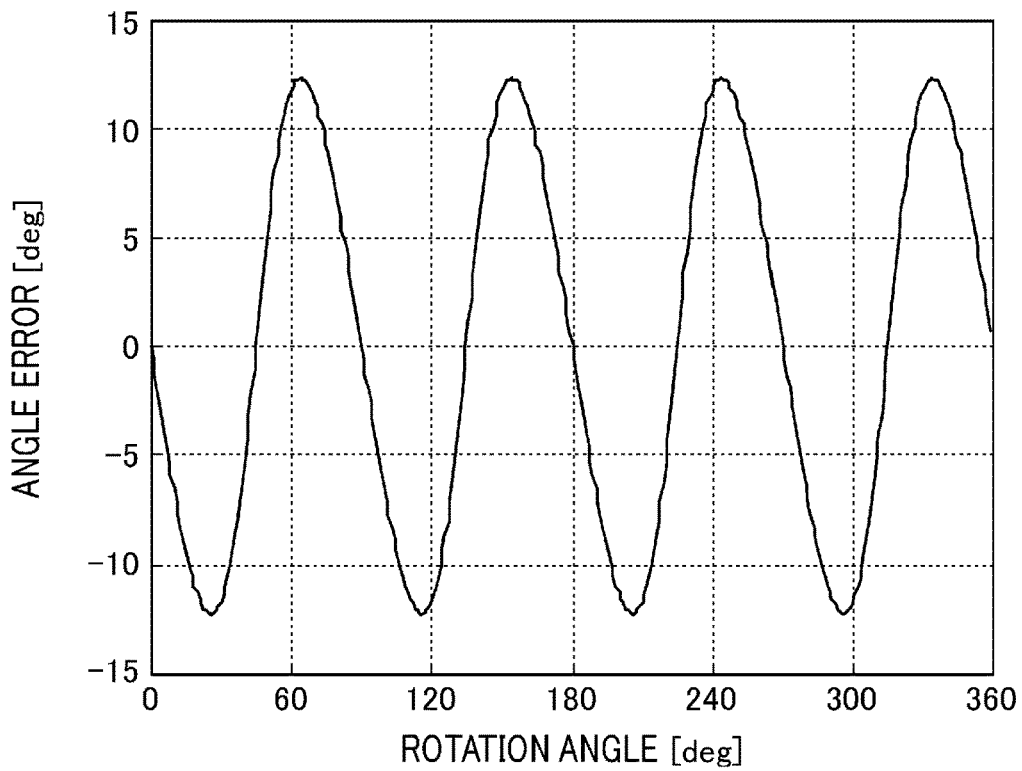
FIG. 15 is an explanation view for explaining an angle error of a sensor in the angle detection device of Embodiment 2 of the present invention.
Figure 16:
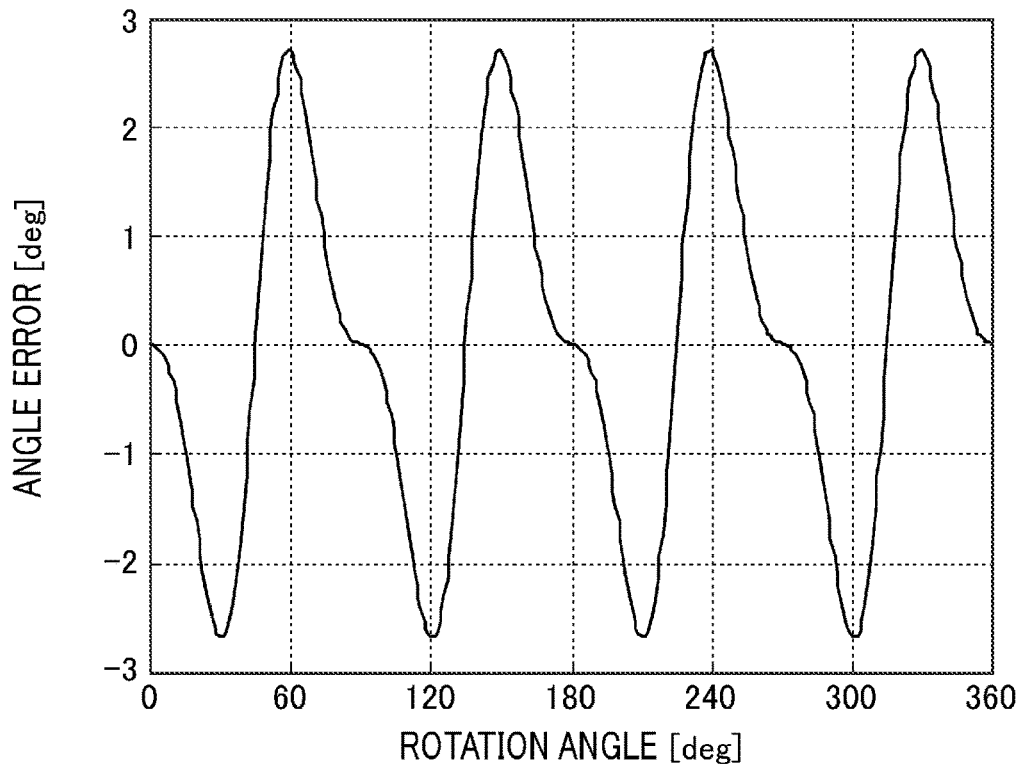
FIG. 16 is an explanation view for explaining an angle error of the sensors in the angle detection device of Embodiment 2 of the present invention.

The angle calculator 13c calculates a rotation angle θ1 from Vcos1 and −Vcos2, and calculates a rotation angle θ2 from Vsin1 and Vsin2. Since each combination has the same amplitude of each order component including a fundamental wave, a (4n−2)th order angle error does not appear. Then, an angle error included in the rotation angle θ1 becomes like FIG. 14 and an angle error included in the rotation angle θ2 becomes like FIG. 15. Phases of a largest 4th order angle error are different by 180 [deg]; and an angle error can be reduced like FIG. 16 by setting an average of the two as the rotation angle θ.

Further, a rotation angle after one time correction θ' or a rotation angle after two time correction θ'' is calculated by using the correction formula with respect to the rotation angle θ similarly to Embodiment 1, whereby an unprecedented effect can be obtained in that a 4nth order component (where, n is a natural number) of the angle error can be reduced.

Figure 17:
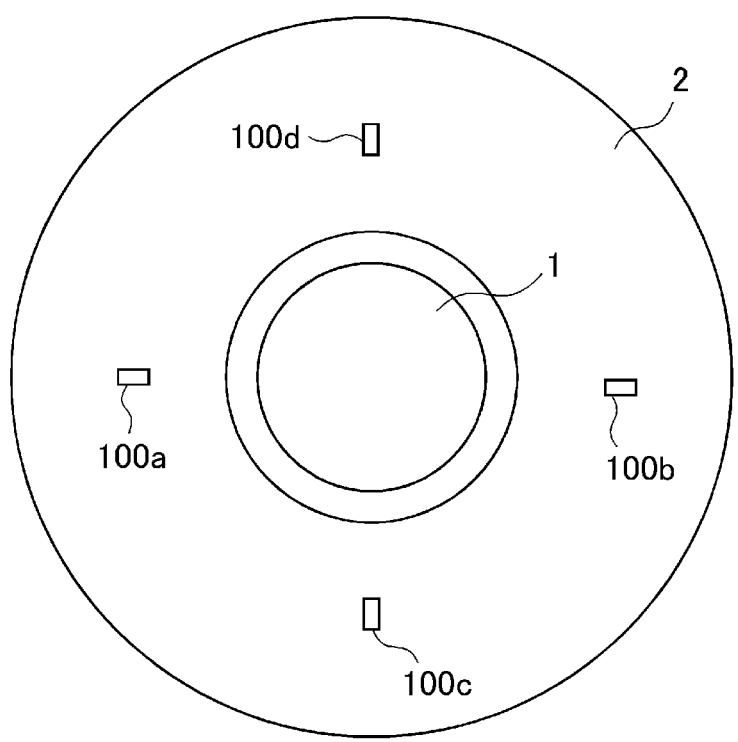
FIG. 17 is an explanation view showing an arrangement relationship of sensors in a modified example of an angle detection device according to Embodiment 2 of the present invention.
Figure 18:
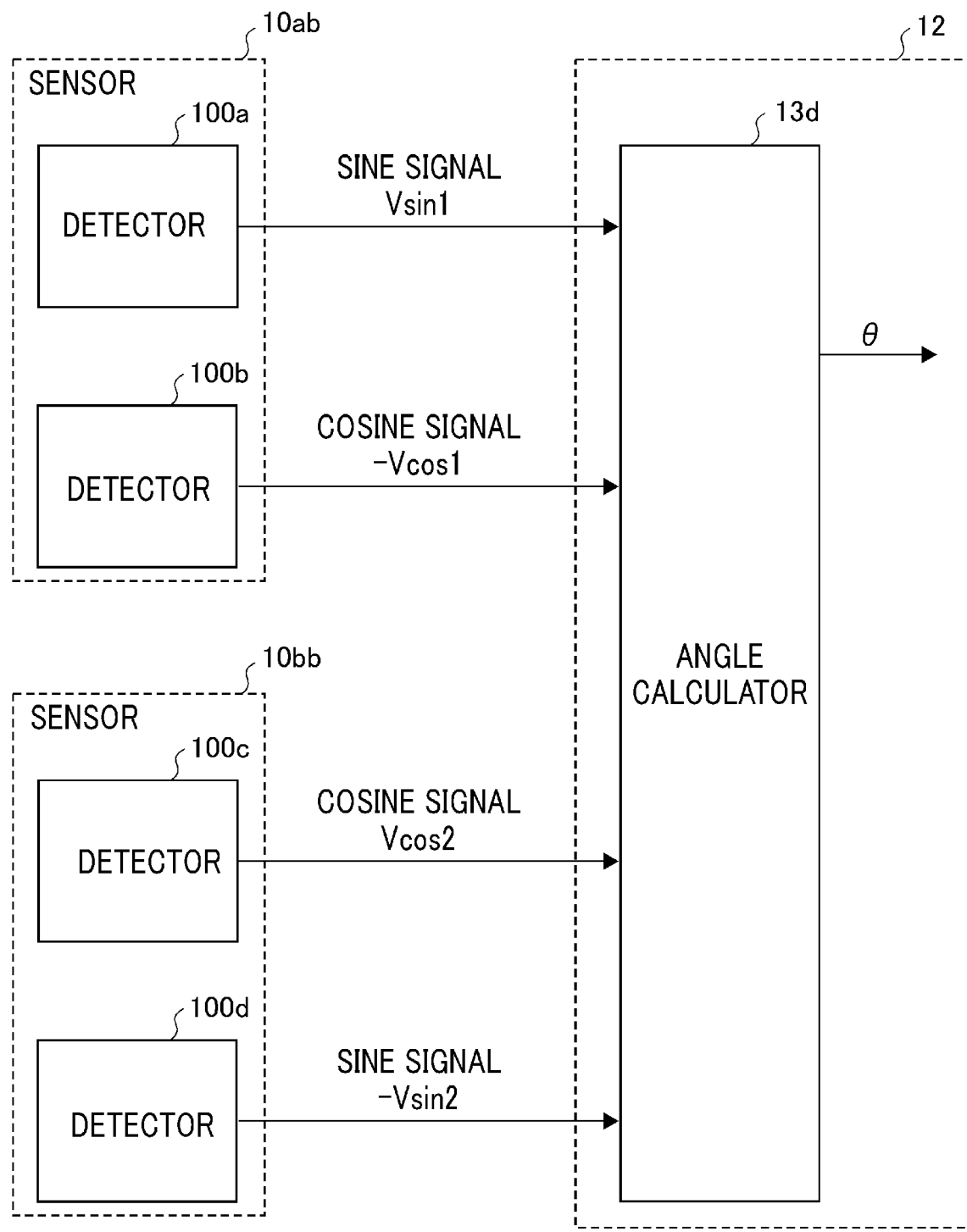
FIG. 18 is a block diagram showing a modified example of the angle detection device in Embodiment 2 of the present invention.

Incidentally, it is permissible if Vsin1 and Vcos2 show the same axis component and Vcos1 and Vsin2 show the same axis component; and thus, detectors of the sensors may be arranged like FIG. 17. FIG. 18 a block diagram showing a modified example of an angle detection device which uses an angle calculator 13d that calculates a rotation angle θ by using signals from the sensors arranged like FIG. 17. As shown in FIG. 18, a sensor 10ab is composed of a detector 100a and a detector 100b; and the detector 100a outputs a sine signal Vsin1 and the detector 100b outputs a cosine signal −Vcos1. A sensor 10bb is composed of a detector 100c and a detector 100d; and the detector 100c outputs a cosine signal Vcos2 and the detector 100b outputs a sine signal −Vsin2. The angle calculator 13d calculates the rotation angle θ by using these signals.

Incidentally, a (2q−1)th order signal error included in Vcos1, Vsin1, Vcos2, and Vsin2 corrected by a signal error correction quantity based on a previous rotation angle value or an estimated rotation angle; and then, a rotation angle θ1 or a rotation angle θ2 may be calculated.

In the present embodiment, the signals outputted by a first sensor and a second sensor according to a magnetic field for detection are the sine signals and the cosine signals; and the angle calculator sets the average of the angle calculated from the sine signal outputted by the first sensor and the sine signal outputted by the second sensor and the angle calculated from the cosine signal outputted by the first sensor and the cosine signal outputted by the second sensor, as the rotation angle. Moreover, in the angle calculator, at least one of the sine signal, the cosine signal, the sine signal after correction, or the cosine signal after correction, which is used for calculating the rotation angle is one in which the (2q−1)th order signal error (where, q is a natural number) is corrected. Additionally, the angle calculator corrects the signal error by the previous rotation angle value.

Embodiment 3

In the present embodiment, an angle calculator (not shown in the drawing, for the sake of simplicity, also referred to as an angle calculator 13e) which calculates a rotation angle θ on the basis of a formula (9) is used instead of the angle calculator 13 in the block diagram of FIG. 10.

From the abovementioned formula (6) and formula (7), in the case of calculating a detection angle by an arc tangent function, Vcos1+Vsin2 may be used instead of Vcos1 as a cosine signal; and Vsin1−Vcos2 may be used instead of Vsin1 as a sine signal.

Formula 8

$$\begin{cases} V_{cos1} + V_{sin2} = \begin{array}{l}(a_1 + d_1)\cos\theta + (-a_3 + d_3)\cos 3\theta + \\ (a_5 + d_5)\cos 5\theta + (-a_7 + d_7)\cos 7\theta + \ldots\end{array} \\ V_{sin1} - V_{cos2} = \begin{array}{l}(a_1 + d_1)\sin\theta + (a_3 - d_3)\sin 3\theta + \\ (a_5 + d_5)\sin 5\theta + (a_7 - d_7)\sin 7\theta + \ldots\end{array} \end{cases} \quad (8)$$

According to formula (8), each order component also has the same amplitude; and when n is a natural number, a signal error of a (4n−1)th order component appears at a 4nth order angle error and a signal error of a (4n+1)th order component appears at the 4nth order angle error.

In the angle calculator 13e, θ is calculated on the basis of a formula (9) from Vcos1+Vsin2 and Vsin1−Vcos2.

Formula 9

$$\theta = \tan^{-1}\left(\frac{V_{sin1} - V_{cos2}}{V_{cos1} + V_{sin2}}\right) \quad (9)$$

Figure 19:
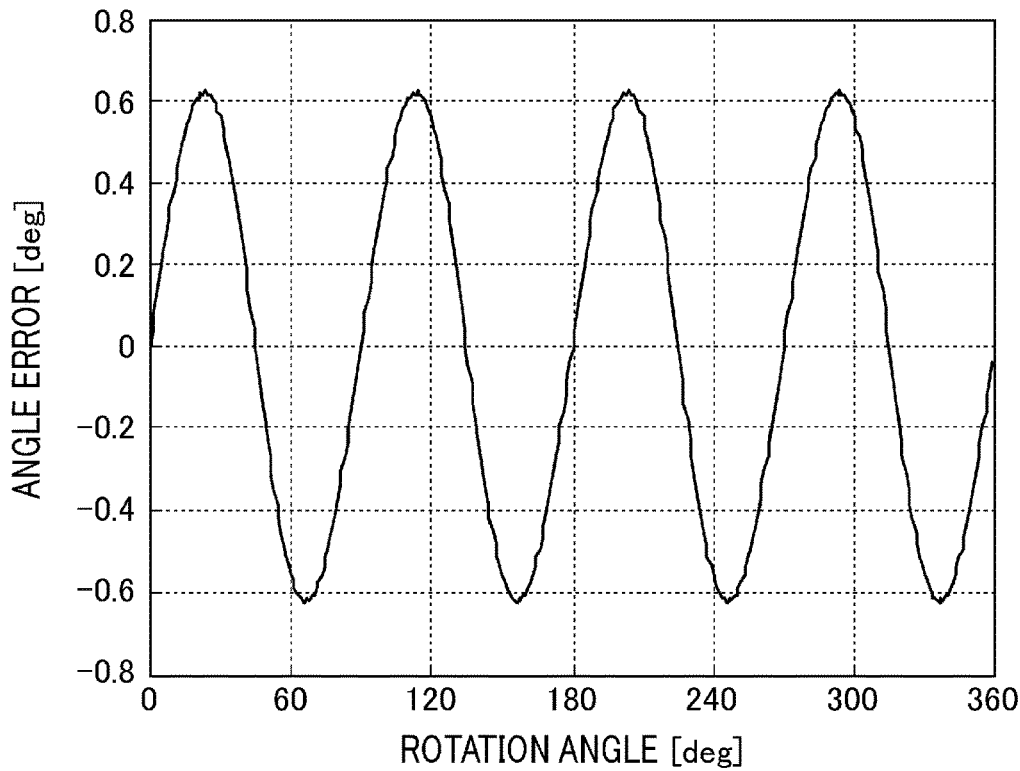
FIG. 19 is as explanation view for explaining an angle error of sensors in an angle detection device of Embodiment 3 of the present invention.
Figure 20:
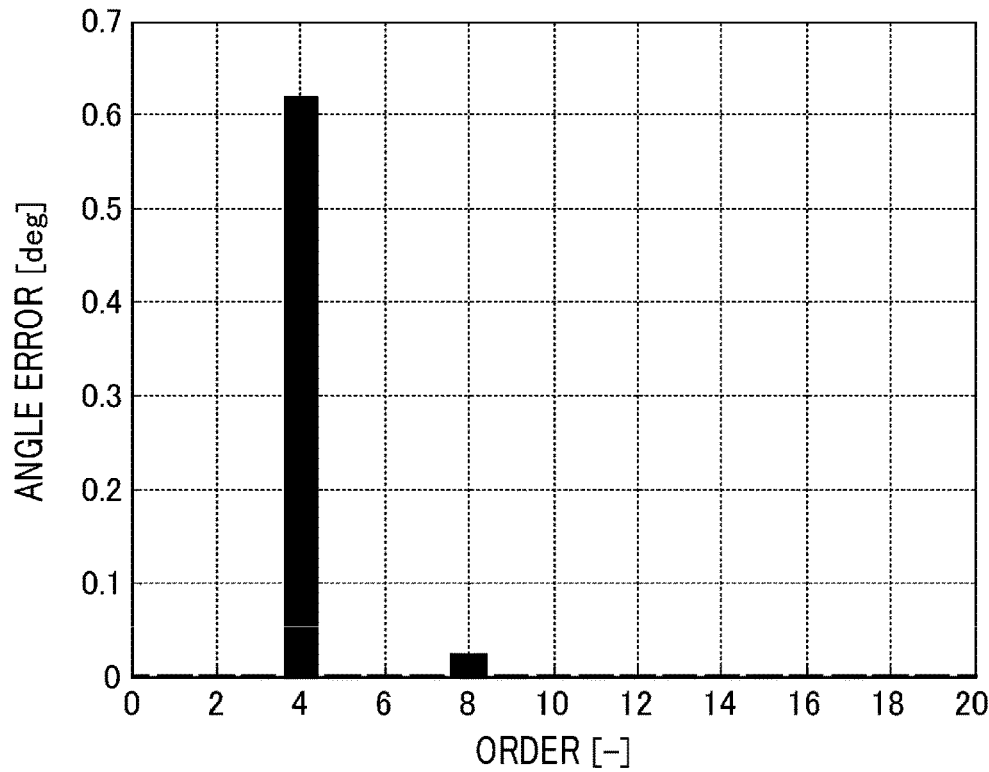
FIG. 20 is an explanation view for explaining an angle error of the sensors in the angle detection device of Embodiment 3 of the present invention.

In other words, the rotation angle calculated from a sine signal after correction which is obtained by subtracting the cosine signal obtained from a sensor 10b arranged at a position advanced in phase by 90 [deg] from the sine signal obtained from a sensor 10a, and a cosine signal after correction which is obtained adding the sine signal obtained from the sensor 10b arranged at the position advanced in phase by 90 [deg] to the cosine signal obtained from the sensor 10a, thereby allowing to become an angle error of 4th order and 8th order components like FIG. 19 and FIG. 20, and whereby the angle error can be reduced to a sufficiently small value with respect to the angle error in the case where each of the sensor 10a or the sensor 10b is used alone.

Here, the description has been made on the case where the sine signal after correction and the cosine signal after correction have the same amplitude of a fundamental wave; however, in the case where the amplitude of the fundamental wave is different, it is to be understood that similar effects are obtained if using after correction according to the amplitude ratio thereof. Incidentally, the correction is performed according to the ratio of amplitude of the fundamental waves of corresponding signals to input signals from the sensor 10a and the sensor 10b; and then, the sine signal after correction and the cosine signal after correction may be calculated.

Since the arc tangent function is often calculated by using a table or the like, an unprecedented effect is obtained in that a processing load can be reduced so much because the angle does not need to be calculated once from the original signal.

Figure 21:
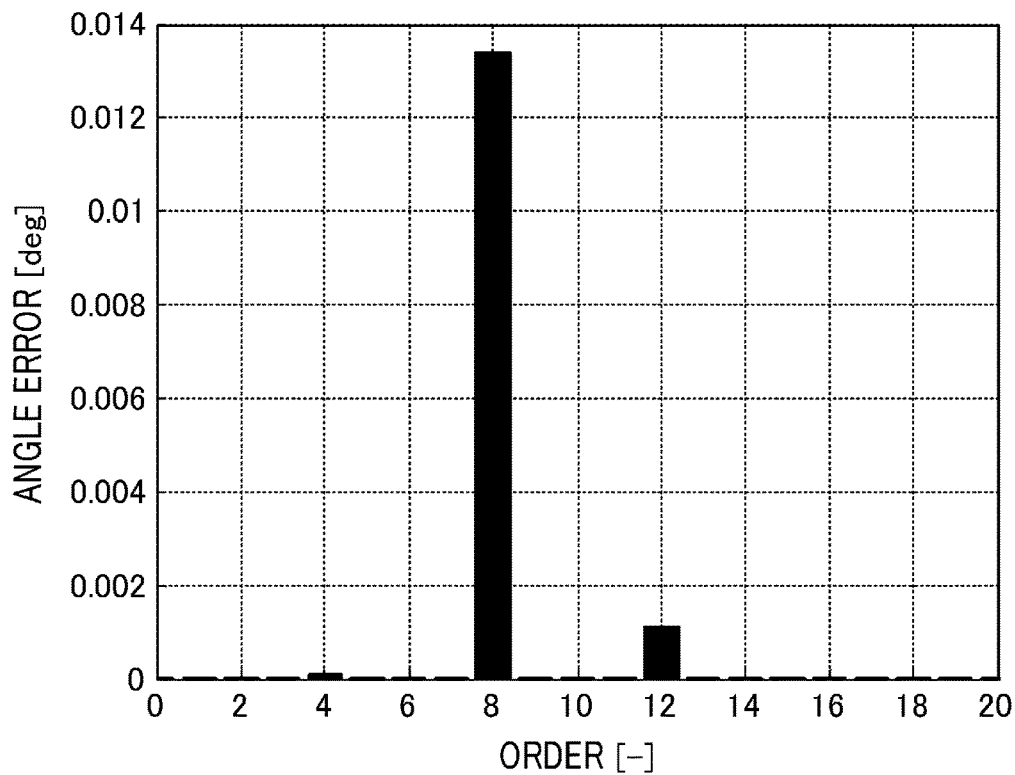
FIG. 21 is an explanation view for explaining correction of an angle error in an angle detection device of Embodiment 3 of the present invention.
Figure 22:
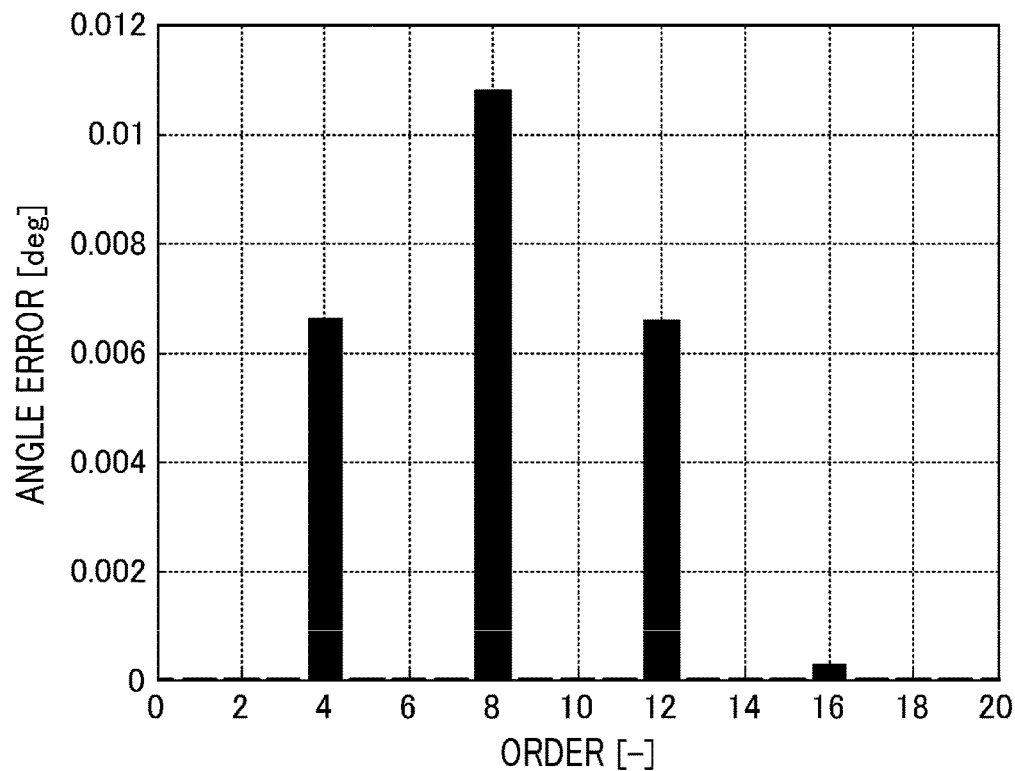
FIG. 22 is an explanation view for explaining correction of an angle error in the angle detection device of Embodiment 3 of the present invention.

Further, as in Embodiment 1, an angle calculator (not shown in the drawing, for the sake of simplicity, referred to as an angle calculator 13f) which calculates rotation angle θ' or rotation angle θ'' by using a correction formula such as a formula (4) or a formula (5) with respect to the rotation angle θ, may be used. Since the angle error is small like FIG. 19 and FIG. 20 at the time before correction by using the angle calculator 13f, a correction effect by a formula (4) is brought out remarkably like FIG. 21 and FIG. 22.

As described above, the rotation angle θ' is calculated by subtracting a 4nth order correction function with respect to the rotation angle θ calculated from the sine signal after correction which is obtained by subtracting the cosine signal obtained from the sensor 10b arranged at the position advanced in phase by 90 [deg] from the sine signal obtained from the sensor 10a, and the cosine signal after correction which is obtained by adding the sine signal obtained from the sensor 10b arranged at the position advanced in phase by 90 [deg] to the cosine signal obtained from the sensor 10a, whereby an unprecedented effect can be obtained in that it can be reduced to a minute angle error.

Incidentally, a (2q−1)th order signal error included in Vcos1+Vsin2 and Vsin1−Vcos2 is corrected by a signal error correction quantity based on previous rotation angle value an estimated rotation angle; and then, the rotation angle θ may be calculated.

Incidentally, it is permissible if Vsin1 and Vcos2 show the same axis component and Vcos1 and Vsin2 show the same axis component; and thus, it is to be understood that similar effects are obtained even the arrangement is like FIG. 17.

In the present embodiment, the angle calculator calculates the rotation angle after multiplying the ratio of amplitude of the fundamental waves of the sine signal after correction and the cosine signal after correction and any of the signals together. Furthermore, the angle calculator corrects the signal error by the estimated rotation angle based on the previous rotation angle value.

Embodiment 4

In the present embodiment, an angle calculator (not shown in the drawing, for the sake of simplicity, also referred to as an angle calculator 13g) which calculates a rotation angle θ on the basis of a formula (11) is used instead of the angle calculator 13 in the block diagram of FIG. 10.

Of signal errors included in Vcos1+Vsin2 and Vsin1−Vcos2, a largest one is a 5th component; however, there is a difference between signal errors of a (4n−1)th order component of Vcos1 and Vsin1 (a3 and d3, a7 and d7, . . . ), and thus, a 3rd order component may also be relatively large.

The angle calculator 13g calculates Vcos1+kVsin2 and kVsin1−Vcos2 by using signals obtained from a sensor 10a and a sensor 10b. The ratio of (2n+1)th order component (where, n is a natural number) of a to that of d is similar; and thus, for example, k is given by a formula (10).

Formula 10

$$k = \frac{a_3}{d_3} \quad (10)$$

Further, the rotation angle θ is calculated on the basis of a formula (11) from Vcos1+kVsin2 and kVsin1−Vcos2.

Formula 11

$$\theta = \tan^{-1}\left(\frac{kV_{sin1} - V_{cos2}}{V_{cos1} + kV_{sin2}}\right) \quad (11)$$

Figure 23:
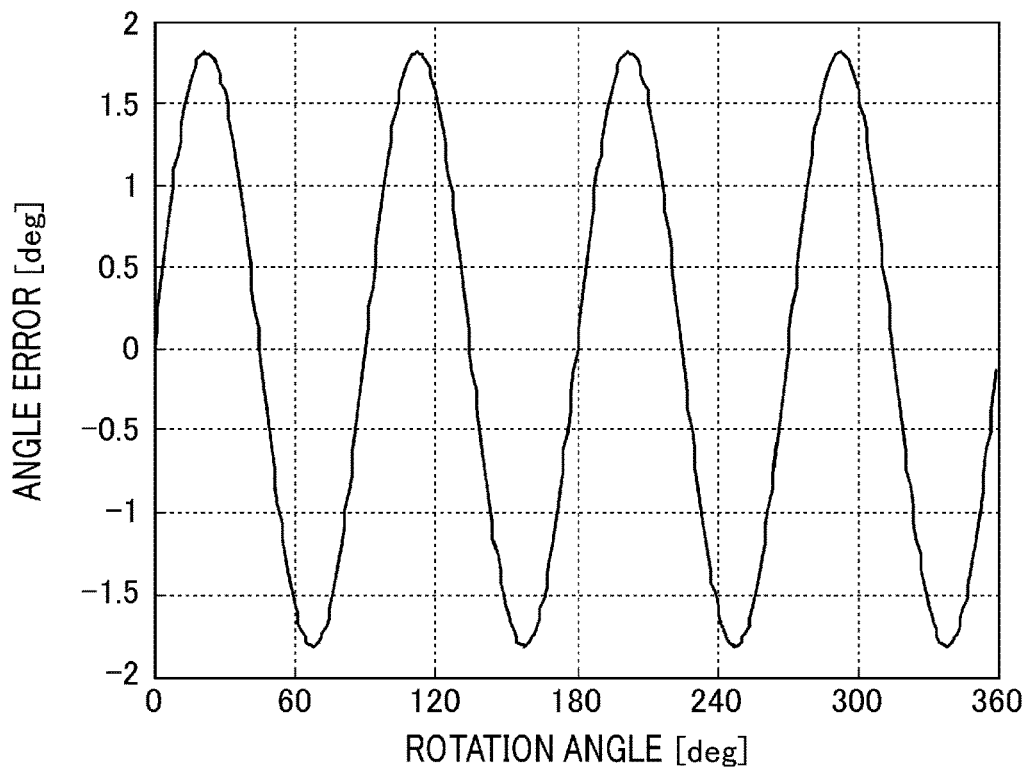
FIG. 23 is an explanation view for explaining an angle error of sensors in an angle detection device of Embodiment 4 of the present invention.
Figure 24:
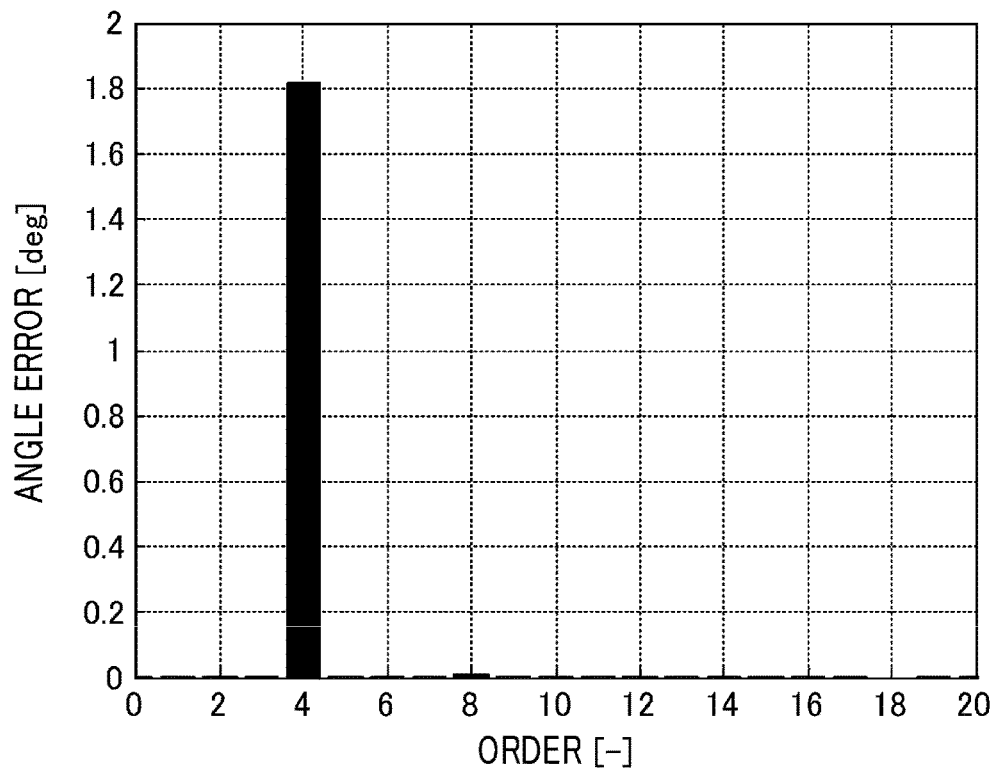
FIG. 24 is an explanation view for explaining an angle error of the sensors in the angle detection device of Embodiment 4 of the present invention.

In other words, the rotation angle is calculated from a sine signal after correction which is obtained by subtracting a cosine signal obtained from the sensor 10b arranged at a position advanced in phase by 90 [deg] from one in which a sine signal obtained from the sensor 10a and the ratio of 3rd order components are multiplied together, and a cosine signal after correction which is obtained by adding one in which a sine signal obtained from the sensor 10b arranged at the position advanced in phase by 90 [deg] and the ratio of 3rd order components are multiplied together to a cosine signal obtained from the sensor 10a, thereby allowing to mostly become an angle error of a 4th order component like FIG. 23 and FIG. 24, and whereby the angle error can be reduced to a sufficiently small value with respect to the angle error in the case where each of the sensor 10a or the sensor 10b is used alone. Here, the ratio of 3rd order components is multiplied; however, similar effects can be obtained even using the ratio of (2n+1)th order components other than the 3rd order.

Since an arc tangent function is often calculated by using a table or the like, an unprecedented effect is obtained in that processing load can be reduced so much because the angle does not need to be calculated once from the original signal.

Further, as in Embodiment 1, an angle calculator (not shown in the drawing, for the sake of simplicity, also referred to as an angle calculator 13h) which corrects with respect to the rotation angle θ may be used. Here, since amplitude is adjusted and the rotation angle is calculated for aiming cancellation of a (4n−1)th order component by using the angle calculator 13h, a formula (12) may be used for the correction of the angle error. In this regard, however, 4th amplitude is larger as compared to Embodiment 3 like FIG. 23 and FIG. 24; and thus, in the case of reducing the angle error largely, a plurality of corrections may be performed by a formula (13) or the like.

Formula 12

$$\theta' = \theta - k_4 \sin 4\theta \quad (12)$$

Formula 13

$$\theta'' = \theta - k_4 \sin 4\theta' \quad (13)$$

As described above, a rotation angle θ' or θ'' is calculated by subtracting a 4th order correction function with respect to the rotation angle θ calculated from a sine signal after correction which is obtained by subtracting a cosine signal obtained from the sensor 10b arranged at a position advanced is phase by 90 [deg] from one in which a sine signal obtained from the sensor 10a and the ratio of 3rd order components are multiplied together, and a cosine signal after correction which is obtained by adding one in which a sine signal obtained from the sensor 10b arranged at the position advanced in phase by 90 [deg] and the ratio of 3rd order components are multiplied together to a cosine signal obtained from the sensor 10a, whereby an unprecedented effect can be obtained in that it can be reduced to a minute angle error.

Incidentally, a (2q−1)th order signal error included in Vcos1+kVsin2 and kVsin1−Vcos2 corrected by a signal error correction quantity based on a previous rotation angle value or an estimated rotation angle; and then, the rotation angle θ may be calculated.

Incidentally, it is permissible if Vsin1 and Vcos2 show the same axis component and Vcos1 and Vsin2 show the same axis component; and thus, it is to be understood that similar effects are obtained even the arrangement is like FIG. 17.

In the present embodiment, the signals outputted by a first sensor and a second sensor according to a magnetic field for detection are the sine signal and the cosine signal; and the angle calculator calculates the rotation angle from a sine signal after correction which is obtained from the sum or the difference of Ks times of the sine signal outputted by the first sensor and Kc times of the cosine signal outputted by the second sensor, and a cosine signal after correction which obtained from the sum or the difference of Kc times of the cosine signal outputted by the first sensor and Ks times of the sine signal outputted by the second sensor. Furthermore, either of gain Ks to be multiplied to the sine signal or gain Kc to be multiplied to the cosine signal is 1; and the other is based on the ratio of (2p+1)th order components (where, p is a natural number) of the sine signal and the cosine signal.

Embodiment 5

With regard to the case where one of sensor 10a or a sensor 10b cannot be obtained due to a failure, in the present embodiment, an angle calculator (not shown in the drawing, for the sake of simplicity, also referred to as an angle calculator 13$i$) which calculates a rotation angle $\theta$ in consideration of a correction quantity with respect to the rotation angle $\theta$ is used instead of the angle calculator 13 in the block diagram of FIG. 10. Here, description will be made on the case where the sensor 10$b$ fails.

Figure 25:
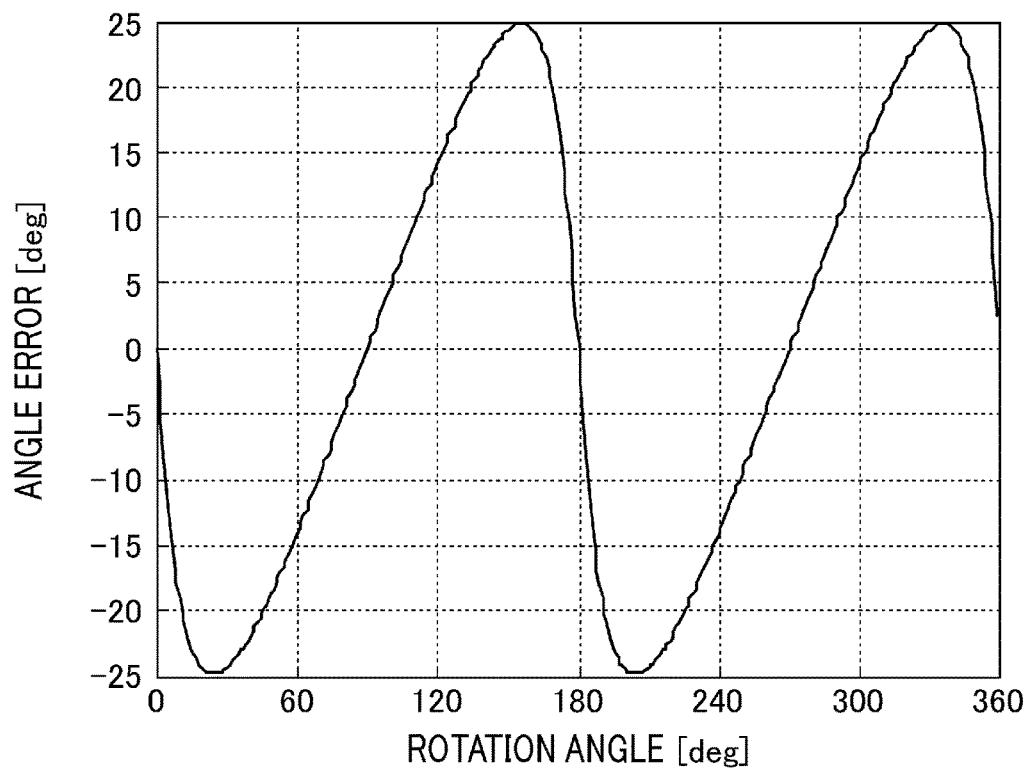
FIG. 25 is an explanation view for explaining an angle error of a sensor in as angle detection device of Embodiment 5 of the present invention.
Figure 26:
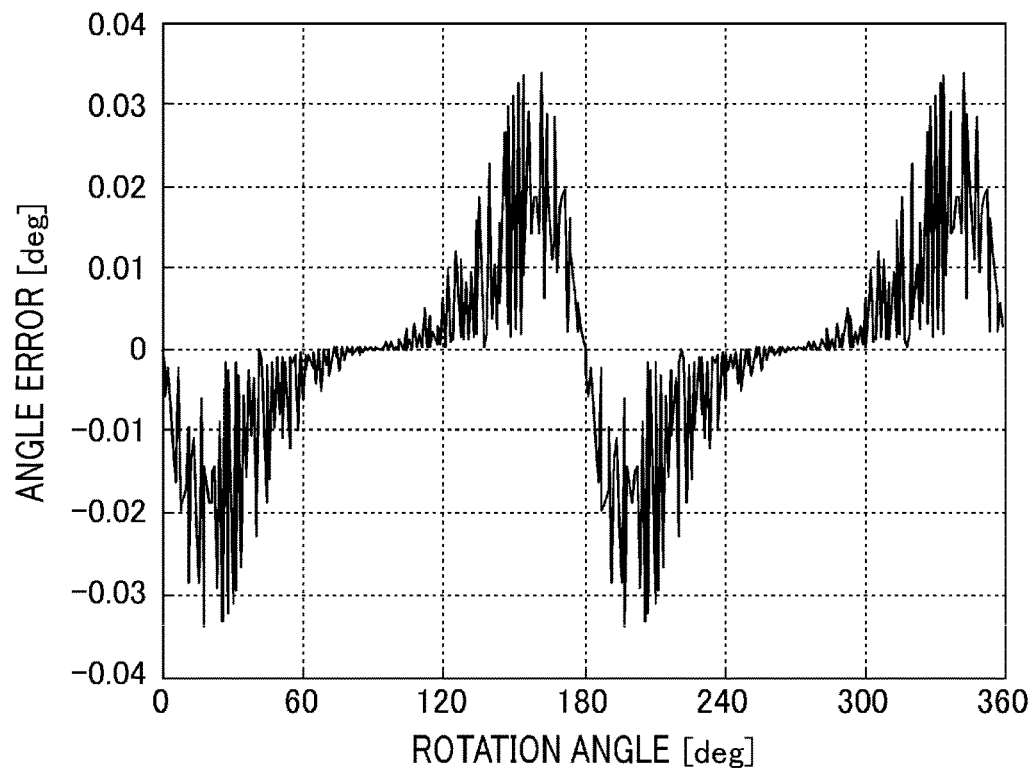
FIG. 26 is as explanation view for explaining an angle error of the sensor in the angle detection device of Embodiment 5 and Embodiment 6 of the present invention.
Figure 27:
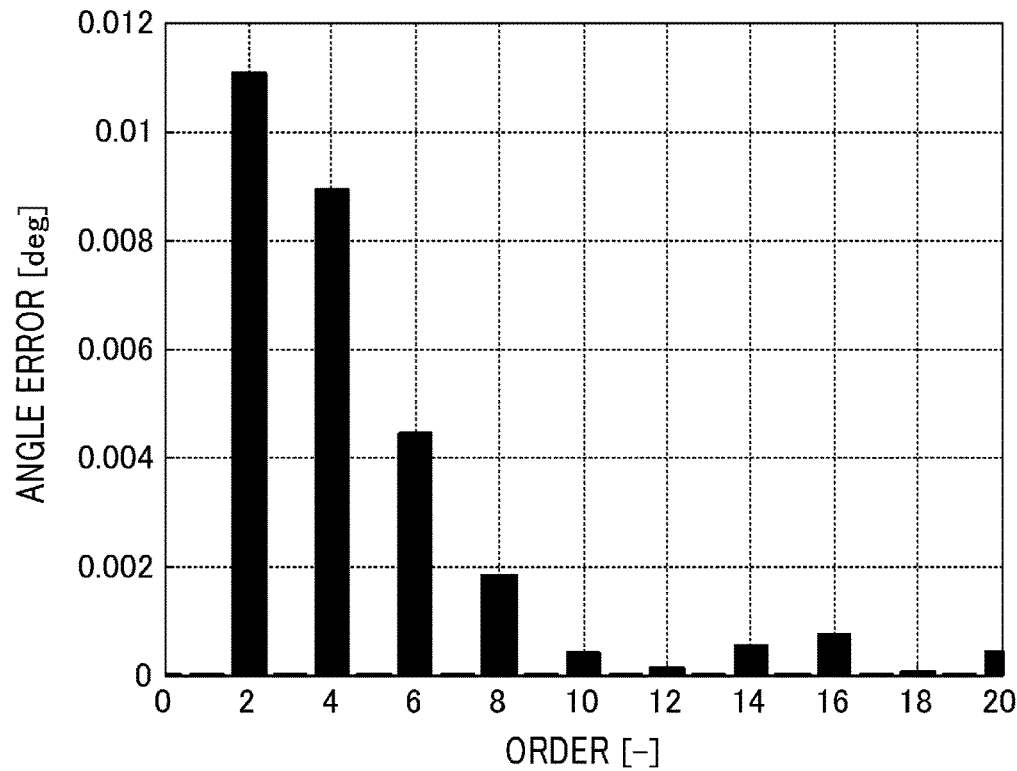
FIG. 27 is an explanation view for explaining an angle error of the sensor in the angle detection device of Embodiment 5 and Embodiment 6 of the present invention.

Since a signal outputted by the sensor 10$b$ cannot be obtained, the rotation angle needs to be calculated by Vcos1 and Vsin1 outputted by the sensor 10$a$. In this regard, however, a signal error included in Vcos1 and Vsin1 is large: and accordingly, an error included in the angle obtained from two signals also becomes large as shown in FIG. 5. A rotation angle set as a horizontal axis of FIG. 5 is an angle true value; and when the rotation angle which can be actually used for correction and is obtained by detection is set as the horizontal axis, it becomes a distorted form like FIG. 25. The angle calculator 13$i$ has a waveform of FIG. 25 as a correction table and calculates a correction quantity $\delta$ with respect to the rotation angle $\theta$ calculated from Vcos1 and Vsin1. A rotation angle $\theta'$ after correction is calculated by subtracting the correction quantity $\delta$ from the rotation angle $\theta$. An angle error included in the rotation angle $\theta$ can be reduced to be minute as shown in FIG. 26 and FIG. 27.

Here, the description has been made on the case where two sensors of the sensor 10$a$ and the sensor 10$b$ are provided during normal time and one sensor cannot be used due to the failure; however, in the case where a sensor set arranged at a position deviated in phase by 90 [deg] is not available due to a failure in an angle detection device provided with three or more sensors, similar effects can be obtained.

As described above, in the case where the sensor set arranged at the position deviated in phase by 90 [deg] is not available when some of a plurality of the sensors fails, the rotation angle $\theta'$ calculated by subtracting the angle error determined by the positional relationship between a sensor magnet 2 and the sensor 10$a$ with respect to the rotation angle $\theta$ calculated from the sine signal and the cosine signal obtained from the sensor 10$a$, whereby an unprecedented effect can be obtained in that it can be reduced to a minute angle error.

Incidentally, the correction is performed by using the correction table in the present embodiment 5; however, it is to be understood that similar effects are obtained even by correcting by a formula such as a formula (12).

Incidentally, a (2q−1)th order signal error included in Vcos1 and Vsin1 is corrected by a signal error correction quantity based on a previous rotation angle value or an estimated rotation angle; and then, an electrical angle $\theta$ may be calculated.

In the present embodiment, the angle calculator 13$i$ calculates the rotation angle from the sine signal and the sine signal at the position separated by 90 [deg] when the cosine signal of one of the sensors fails, or calculates the rotation angle from the cosine signal and the cosine signal at the position separated by 90 [deg] when the sine signal of one of the sensors fails. Furthermore, the angle calculator calculates the rotation angle from output information of the other sensor when one of the sensors fails, and calculates a rotation angle after m time correction (where, m is a natural number) by correcting a 2nth order (where, n is a natural number) angle error with respect to the rotation angle.

Embodiment 6

With regard to the case where one of four signals obtained from a sensor 10$a$ and a sensor 10$b$ cannot be obtained due to a failure, in the present embodiment, an angle calculator (not shown in the drawing, for the sake of simplicity, also referred to as an angle calculator 13$j$) which calculates a rotation angle $\theta$ in consideration of a correction quantity with respect to the rotation angle $\theta$ is used instead of the angle calculator 13 in the block diagram of FIG. 10. Here, description will be made on the case where a sine signal of the sensor 10$b$ fails.

The rotation angle needs to be calculated by Vcos1 and Vsin1 which are outputted by the sensor 10$a$ and Vcos2 outputted by the sensor 10$b$. Vcos1 and Vsin1 have a large difference in amplitude of fundamental waves, thereby causing an extremely large 2nd order angle error. On the other hand, although there is a small difference in mounting variation in Vcos2 and Vcos1, Vcos2 and Vcos1 have almost the same amplitude of the fundamental waves; and thus, the 2nd order angle error can be suppressed like FIG. 14. Also in the case of performing correction, the smaller the error before correction is, the more the accuracy after correction can be secured; and thus, the angle calculator 13$j$ of the present embodiment calculates a correction quantity $\delta$ with respect to the rotation angle $\theta$ calculated from Vcos1 and Vcos2. The correction quantity $\delta$ may be calculated by a correction table or a correction formula. A rotation angle $\theta'$ after correction is calculated by subtracting the correction quantity $\delta$ from the rotation angle $\theta$.

Figure 28:
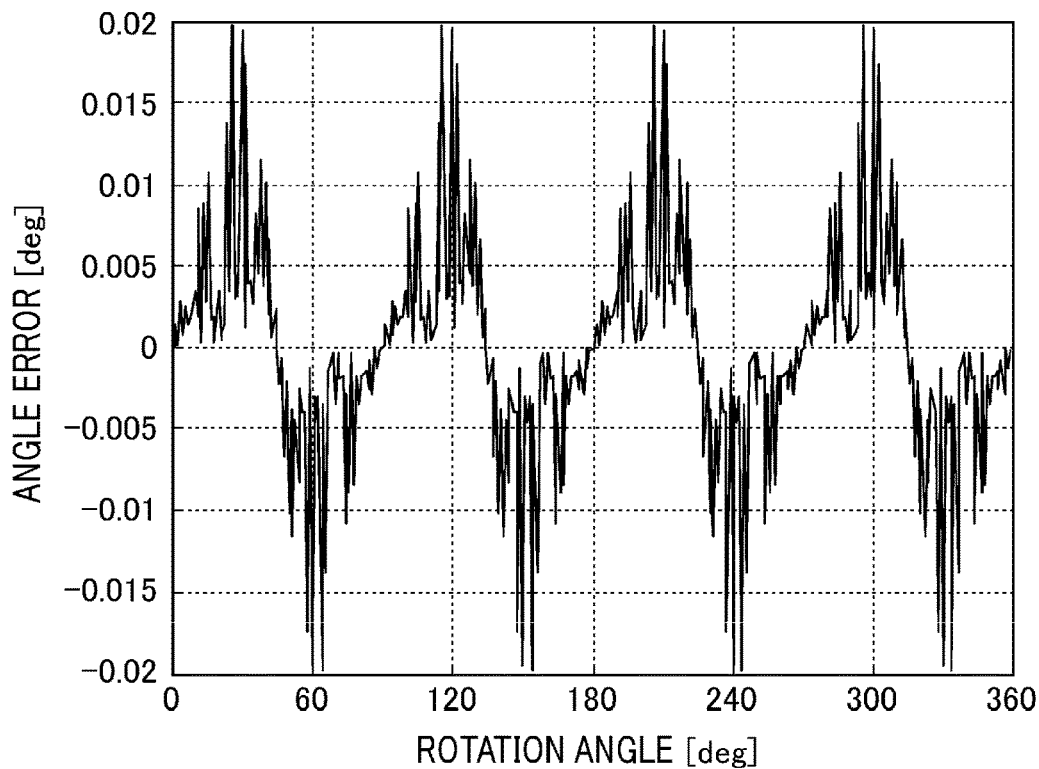
FIG. 28 is an explanation view for explaining an angle error of a sensor in an angle detection device of Embodiment 6 of the present invention.
Figure 29:
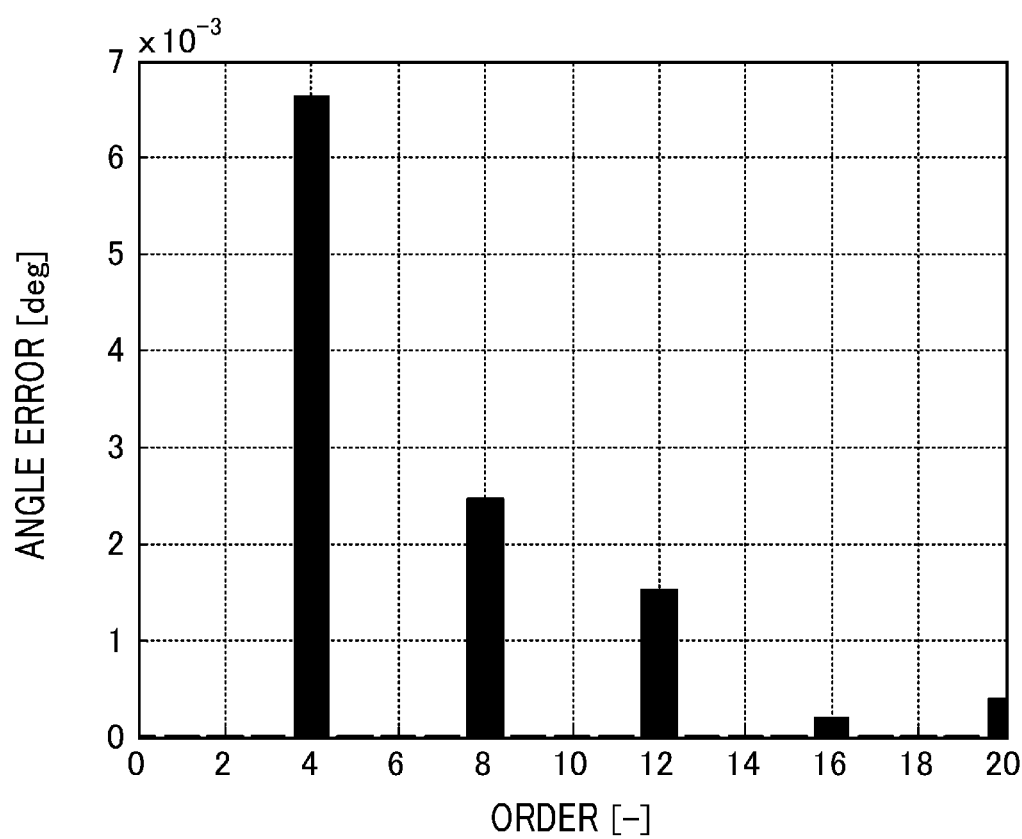
FIG. 29 is an explanation view for explaining an angle error of the sensor in the angle detection device of Embodiment 6 of the present invention.

The angle error included in the rotation angle $\theta'$ can be reduced to be more minute with respect to FIG. 26 and FIG. 27 calculated by using two signals of the sensor 10$a$ as shown in FIG. 28 and FIG. 29.

Here, the description has been made on the case where one of four signals obtained from the sensor 10$a$ and the sensor 10$b$ cannot be obtained due to the failure; however, in the case where some signal cannot be obtained due to a failure in an angle detection device provided with three or more sensors, similar effects are obtained by using a set of the sine signals or the cosine signals arranged at a position deviated in phase by 90 [deg].

As described above, when some of a plurality of sensors fails, the rotation angle $\theta'$ calculated by subtracting an angle error determined by the positional relationship between a sensor magnet 2 and the sensor 10$a$ with respect to the rotation angle $\theta$ calculated from a set of the sine signals or the cosine signals arranged at the position deviated in phase by 90 [deg], whereby an unprecedented effect can be obtained in that it can be reduced to a minute angle error.

Incidentally, the correction is performed by using the correction table in the present embodiment 6; however, it is to be understood that similar effects are obtained even by correcting by a formula such as a formula (12).

Incidentally, a (2q−1)th order signal error included in Vcos1, Vsin1, Vcos2, and Vsin2 is corrected a signal error correction quantity based on a previous rotation angle value or an estimated rotation angle; and then, the rotation angle $\theta$ may be calculated.

Furthermore, it is permissible if Vsin1 and Vcos2 show the same axis component and Vcos1 and Vsin2 show the same axis component; and thus, it is to be understood that similar effects are obtained even the arrangement is like FIG. 17.

In the present embodiment, the angle calculator 13$j$ calculates the rotation angle from output information of the other sensor when one of the sensors fails, and calculates a rotation angle after m time correction (where, m a natural number) correcting a 2nth order (where, n is a natural number) angle error with respect to the rotation angle.

Embodiment 7

In the present embodiment, an angle calculator (not shown in the drawing, for the sake of simplicity, also referred to as an angle calculator $13k$) which calculates a rotation angle θ on the basis of a formula (9) is used instead of the angle calculator 13 in the block diagram of FIG. 10.

In the case where distortion of a magnetic field of a sensor magnet 2 is large, even order component other than a formula (6) and a formula (7) appears in a signal. At this time, a cosine signal Vcos1 and a sine signal Vsin1 which are outputted by a sensor 10*a* can be expressed like a formula (14); and a cosine signal Vcos2 and a sine signal Vsin2 which are outputted by a sensor 10*b* can be expressed like a formula (15).

Formula 14

$$\begin{cases} V_{cos1} = \begin{array}{l} e_0 + e_1\cos(\theta + \alpha_1) + e_2\cos(2\theta + \alpha_2) + \\ e_3\cos(3\theta + \alpha_3) + e_4\cos(4\theta + \alpha_4) + \ldots \end{array} \\ V_{sin1} = \begin{array}{l} f_0 + f_1\sin(\theta + \beta_1) + f_2\sin(2\theta + \beta_2) + \\ f_3\sin(3\theta + \beta_3) + f_4\sin(4\theta + \beta_4) + \ldots \end{array} \end{cases} \quad (14)$$

Formula 15

$$\begin{cases} V_{cos2} = \begin{array}{l} e_0 + e_1\cos(\theta + \alpha_1 + 90) + e_2\cos(2\theta + \alpha_2 + 180) + \\ e_3\cos(3\theta + \alpha_3 + 270) + e_4\cos(4\theta + \alpha_4) + \ldots \end{array} \\ V_{sin2} = \begin{array}{l} f_0 + f_1\sin(\theta + \beta_1 + 90) + f_2\sin(2\theta + \beta_2 + 180) + \\ f_3\sin(3\theta + \beta_3 + 270) + f_4\sin(4\theta + \beta_4) + \ldots \end{array} \end{cases} \quad (15)$$

Since the sensor 10*a* and the sensor 10*b* are different in phase by 90 [deg], a (4n+2)th order component (where, n is an integer) of the formula (14) is in an opposite phase to that of the formula (15). From this reason, in the case of calculating a detection angle by an arc tangent function, Vcos1+Vcos2 shown in a formula (16) may be used instead of Vcos1 as the cosine signal; and Vsin1+Vsin2 shown in the formula (16) may be used instead of Vsin1 as the sine signal.

Formula 16

$$\begin{cases} V_{cos1} + V_{cos2} = \begin{array}{l} 2e_0 + \sqrt{2}\, e_1\cos(\theta + \alpha_1 + 45) + \\ \sqrt{2}\, e_3\cos(3\theta + \alpha_3 - 45) + 2e_4\cos(4\theta + \alpha_4) + \ldots \end{array} \\ V_{sin1} + V_{sin2} = \begin{array}{l} 2f_0 + \sqrt{2}\, f_1\sin(\theta + \beta_1 + 45) + \\ \sqrt{2}\, f_3\sin(3\theta + \beta_3 - 45) + 2f_4\sin(4\theta + \beta_4) + \ldots \end{array} \end{cases} \quad (16)$$

An nth order angle error is generated by (n−1)th order and (n+1)th order signal errors. In the formula (16), a 2nd order signal error caused by the influence of a magnetic field distortion of the sensor magnet 2 is cancelled out by taking the signal sum; and the ratio of a 4th order signal error to amplitude of a fundamental wave increases by √2 times. If the 2nd order signal error compared to the 4th order signal error, a canceling-out effect of a 2nd order component exceeds because a 4th order component becomes smaller in many cases. In other words, a 3rd order angle error can be reduced by calculating by using the signal sum like the formula (16).

In the angle calculator $13k$, θ is calculated on the basis of a formula (17) from Vcos1+Vcos2 and Vsin1+Vsin2 which are shown in the formula (16).

Formula 17

$$\theta = \tan^{-1}\left(\frac{V_{sin1} + V_{sin2}}{V_{cos1} + V_{cos2}}\right) \quad (17)$$

In other words, the rotation angle is calculated from a sine signal after correction which is obtained by adding the sine signal obtained from the sensor 10*a* and the sine signal obtained from the sensor 10*b* arranged at a position advanced in phase by 90 [deg], and a cosine signal after correction which obtained by adding the cosine signal obtained from the sensor 10*a* and the cosine signal obtained from the sensor 10*b* arranged at the position advanced in phase by 90 [deg], whereby the 3rd order angle error caused by the influence of the magnetic field distortion of the sensor magnet 2 can be reduced to a sufficiently small value with respect to the angle error in the case where each of the sensor 10*a* and the sensor 10*b* is used alone.

In the formula (17), the description has been made on the case where the ratio of amplitude of the fundamental waves of the sine signal after correction and the cosine signal after correction is small; however, in the case where the amplitude of the fundamental wave is different, it is to be understood that similar effects are obtained if using after correction according to the amplitude ratio thereof. Incidentally, the correction is performed according to the ratio of amplitude of the fundamental waves of corresponding signals to input signals from the sensor 10*a* and the sensor 10*b*; and then, the sine signal after correction and the cosine signal after correction may be calculated.

Since the arc tangent function is often calculated by using a table or the like, an unprecedented effect is obtained in that a processing load can be reduced so much because the angle does not need to be calculated once from the original signal. Further, as in other Embodiments, it is to be understood that a correction effect is brought out more remarkably by further correcting with respect to the rotation angle θ.

Embodiment 8

The description has been made on the angle detection devices in the abovementioned embodiments; however: the present embodiment may be applied to an electric power steering apparatus which is provided with the angle detection device and an AC rotary machine that generates assist torque that is for assisting driver's steering, like the present embodiment.

Figure 30:
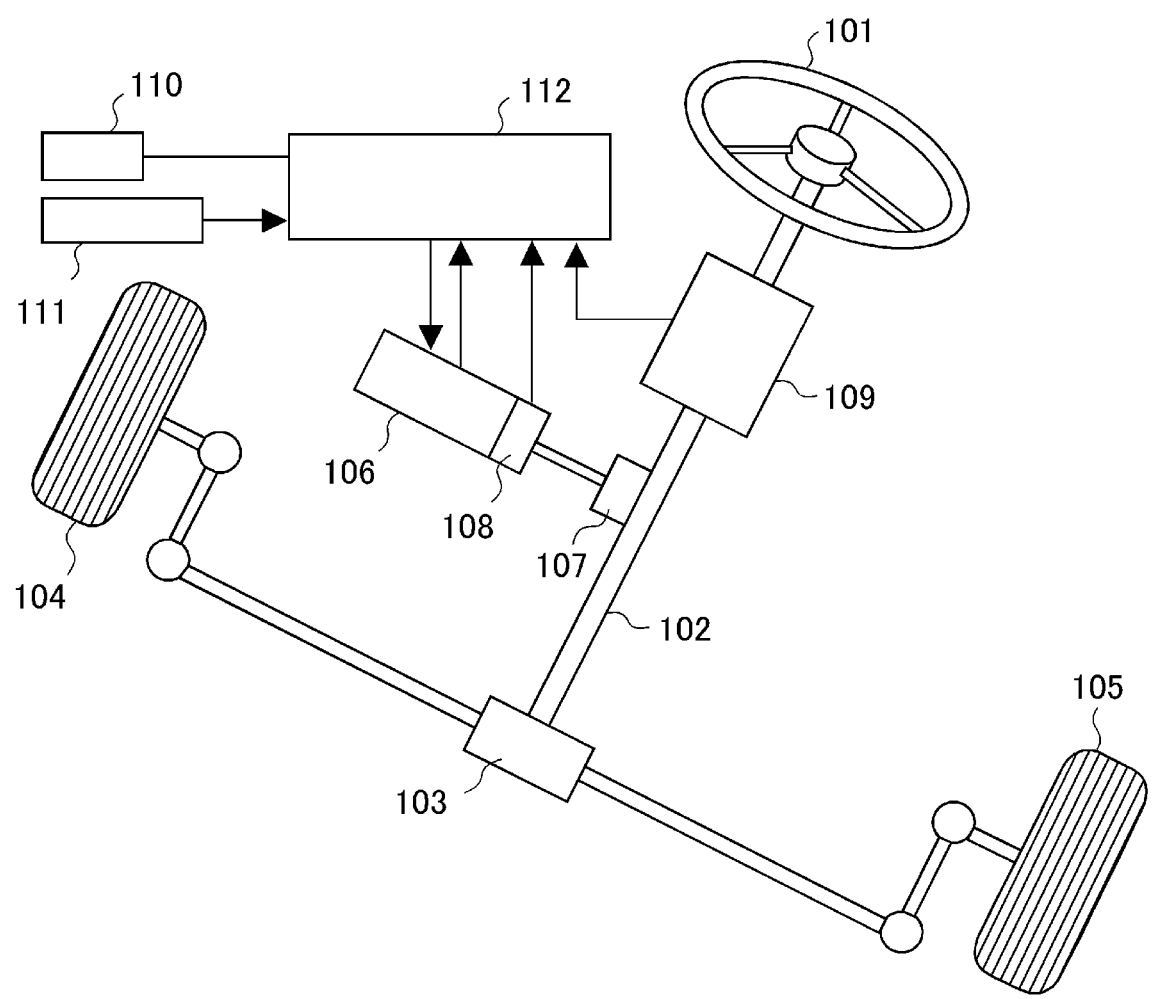
FIG. 30 is a configuration diagram showing an electric power steering apparatus in Embodiment 8 to which the angle detection device according to the present invention is applied.

FIG. 30 is a view showing the configuration of the electric power steering apparatus in Embodiment 6 of the present invention. In FIG. 30, the electric power steering is provided with a steering wheel 101, a steering shaft 102, rack and pinion gears 103, wheels 104 and 105, an AC rotary machine 106, a deceleration gear 107, an angle detection device 108, a torque sensor 109, a power supply (battery) 110, a vehicle speed sensor 111, and a control device 112.

In FIG. 30, steering torque applied from the driver (not shown in the drawing) to the steering wheel 101 passes through a torsion bar of the torque sensor 109 via the steering shaft 102 and is transmitted to the rack via the rack and pinion gears 103 to turn the wheels 104 and 105.

The AC rotary machine 106 is coupled to the steering shaft 102 via the deceleration gear 107. Output torque generated from the AC rotary machine 106 is transmitted to the steering shaft 102 via the deceleration gear 107 to reduce the steering torque applied by the driver during steering. The AC rotary machine 106 uses, for example, a permanent magnet type synchronous rotary machine, a field winding type synchronous rotary machine, an induction machine, and the like.

The torque sensor 109 detects the steering torque applied to the torsion bar by steering the steering wheel 101 by the driver. Since torsion nearly proportional to the steering torque generated in the torsion bar by the steering torque, a torsion angle is detected and is converted to a steering torque signal τ0. The vehicle speed sensor 111 outputs vehicle speed Vx that is a signal in which vehicle running speed is detected.

Furthermore, the angle detection device 108 is any one of the abovementioned embodiments and is mounted to the rotating shaft of the AC rotary machine 106 to output the rotation angle of the AC rotary machine 106.

The control device 112 determines the direction and size of a current command corresponding to output torque outputted by the AC rotary machine 106 according to the steering torque signal τ0 detected by the torque sensor 109, a rotation angle θ obtained by the angle detection device 108, and the vehicle speed detected by the vehicle speed sensor 111. Then, the control device 112 controls current flowing from the power supply 110 to the AC rotary machine 106 on the basis of the current command in order to generate the output torque in the AC rotary machine 106.

In this kind of the device, field-weakening control is often used in order to improve the output in a high rotation area exceeding the rated number of rotations. In this case, if an angle error δ of an nth order rotation (where, n is a natural number) is present, a torque ripple of amplitude, which is expressed by a formula (18) by using a current absolute value I, a current phase angle β, a torque constant Kt, and a d-axis current Id, is generated.

Formula 18

$$K_t I \delta \sin \beta \approx K_t |I_d| \delta \quad (18)$$

In other words, since the torque ripple proportional to the angle error is generated when the d-axis current flows, it leads to a driver's feeling of discomfort. In the electric power steering apparatus provided with the angle detection device of the present embodiment and the AC rotary machine which generates the assist torque that is for assisting driver's steering, an unprecedented effect can be obtained in that the torque ripple proportional to the angle error can be reduced.

The present invention can freely combine the respective embodiments and appropriately modify and/or omit the respective embodiments, within the scope of the present invention.

DESCRIPTION OF REFERENCE NUMERALS

1 Rotating shaft, 2 Sensor magnet, 10a Sensor, 10b Sensor, 10aa Sensor, 10ab Sensor, 10ba Sensor, 10bb Sensor, 12 CPU, 13 Angle calculator

The invention claimed is:
1. An angle detection device comprising:
a ring-shaped sensor magnet configured to rotate integrally with a rotating shaft centering on the rotating shaft, and to generate a magnetic field for angle detection that is for detecting the angle of rotation;
a first sensor and a second sensor each configured to be arranged on a surface opposite to the sensor magnet at a position separated in angle by 90 degrees on a circumference centered on the rotating shaft, a distance from a center of the rotating shaft to the first sensor and the second sensor being smaller than a distance from the center of the rotating shaft to an outer radial edge of the sensor magnet, and to output a signal corresponding to the magnetic field for angle detection; and
an angle calculator configured to calculate a rotation angle by using the signals from the first sensor and the second sensor,
wherein the signals outputted by the first sensor and the second sensor according to the magnetic field for angle detection are a sine signal and a cosine signal; and
the angle calculator sets the average of the angle calculated from the sine signal and the cosine signal which are outputted by the first sensor and the angle calculated from the sine signal and the cosine signal which are outputted by the second sensor, as a rotation angle,
wherein the first sensor is arranged at a first single position on the surface opposite to the sensor magnet and the second sensor is arranged at a second single position on the surface opposite to the sensor magnet separated in angle by 90 degrees from the first single position.

2. The angle detection device according to claim 1,
wherein the signals outputted by the first sensor and the second sensor according to the magnetic field for angle detection are an angle; and
the angle calculator sets the average of the angle outputted by the first sensor and the angle outputted by the second sensor as a rotation angle.

3. The angle detection device according to claim 1,
wherein the angle calculator sets the average of the angle calculated from the sine signal outputted by the first sensor and the sine signal outputted by the second sensor and the angle calculated from the cosine signal outputted by the first sensor and the cosine signal outputted by the second sensor, as a rotation angle.

4. The angle detection device according to claim 1,
wherein the angle calculator calculates the rotation angle from a sine signal after correction which is obtained from the sum or the difference of Ks times of the sine signal outputted by the first sensor and Kc times of the cosine signal outputted by the second sensor, and a cosine signal after correction which is obtained from the sum or the difference of Kc times of the cosine signal outputted by the first sensor and Ks times of the sine signal outputted by the second sensor.

5. The angle detection device according to claim 4,
wherein the angle calculator calculates the rotation angle after multiplying the ratio of amplitude of the fundamental waves of the sine signal after correction and the cosine signal after correction and any of the signals together.

6. The angle detection device according to claim 1,
wherein the angle calculator calculates the rotation angle from a sine signal after correction which is obtained from the sum of the sine signal outputted by the first sensor and the sine signal outputted by the second sensor, and a cosine signal after correction which is obtained from the sum of the cosine signal outputted by the first sensor and the cosine signal outputted by the second sensor.

7. The angle detection device according to claim 1,
wherein the angle calculator calculates a rotation angle after m time correction (where, m is a natural number) by correcting a 4nth order (where, n is a natural number) angle error with respect to the rotation angle calculated by the signals of the first sensor and the second sensor.

8. An electric power steering apparatus comprising:
the angle detection device as set forth in claim 1; and
an AC rotary machine configured to generate assist torque that is for assisting driver's steering.

9. An angle detection device comprising:
a ring-shaped sensor magnet configured to rotate integrally with a rotating shaft centering on the rotating shaft, and to generate a magnetic field for angle detection that is for detecting the angle of rotation;
a first sensor and a second sensor each configured to be arranged on a surface opposite to the sensor magnet at a position separated in angle by 90 degrees on a circumference centered on the rotating shaft, a distance from a center of the rotating shaft to the first sensor and the second sensor being smaller than a distance from the center of the rotating shaft to an outer radial edge of the sensor magnet, and to output a signal corresponding to the magnetic field for angle detection; and
an angle calculator configured to calculate a rotation angle by using the signals from the first sensor and the second sensor,
wherein the signals outputted by the first sensor and the second sensor according to the magnetic field for angle detection are a sine signal and a cosine signal; and
the angle calculator calculates the rotation angle from a sine signal after correction which is obtained from the sum or the difference of Ks times of the sine signal outputted by the first sensor and Kc times of the cosine signal outputted by the second sensor, and a cosine signal after correction which is obtained from the sum or the difference of Kc times of the cosine signal outputted by the first sensor and Ks times of the sine signal outputted by the second sensor, wherein either of gain Ks to be multiplied to the sine signal or gain Kc to be multiplied to the cosine signal is 1; and
the other is based on the ratio of $(2p+1)$th order components (where, p is a natural number) of the sine signal and the cosine signal.

10. An electric power steering apparatus comprising:
the angle detection device as set forth in claim 9; and
an AC rotary machine configured to generate assist torque that is for assisting driver's steering.

11. An angle detection device comprising:
a ring-shaped sensor magnet configured to rotate integrally with a rotating shaft centering on the rotating shaft, and to generate a magnetic field for angle detection that is for detecting the angle of rotation;
a first sensor and a second sensor each configured to be arranged on a surface opposite to the sensor magnet at a position separated in angle by 90 degrees on a circumference centered on the rotating shaft, a distance from a center of the rotating shaft to the first sensor and the second sensor being smaller than a distance from the center of the rotating shaft to an outer radial edge of the sensor magnet, and to output a signal corresponding to the magnetic field for angle detection; and
an angle calculator configured to calculate a rotation angle by using the signals from the first sensor and the second sensor,
wherein the signals outputted by the first sensor and the second sensor according to the magnetic field for angle detection are a sine signal and a cosine signal; and
the angle calculator sets the average of the angle calculated from the sine signal and the cosine signal which are outputted by the first sensor and the angle calculated from the sine signal and the cosine signal which are outputted by the second sensor, as a rotation angle,
wherein the angle calculator calculates the rotation angle from the sine signal and the sine signal at the position separated by 90 degrees when the cosine signal of one of the sensors fails, or calculates the rotation angle from the cosine signal and the cosine signal at the position separated by 90 degrees when the sine signal of one of the sensors fails.

12. An angle detection device comprising:
a ring-shaped sensor magnet configured to rotate integrally with a rotating shaft centering on the rotating shaft, and to generate a magnetic field for angle detection that is for detecting the angle of rotation;
a first sensor and a second sensor each configured to be arranged on a surface opposite to the sensor magnet at a position separated in angle by 90 degrees on a circumference centered on the rotating shaft, a distance from a center of the rotating shaft to the first sensor and the second sensor being smaller than a distance from the center of the rotating shaft to an outer radial edge of the sensor magnet, and to output a signal corresponding to the magnetic field for angle detection; and
an angle calculator configured to calculate a rotation angle by using the signals from the first sensor and the second sensor,
wherein the signals outputted by the first sensor and the second sensor according to the magnetic field for angle detection are a sine signal and a cosine signal; and
the angle calculator sets the average of the angle calculated from the sine signal and the cosine signal which are outputted by the first sensor and the angle calculated from the sine signal and the cosine signal which are outputted by the second sensor, as a rotation angle,
wherein in the angle calculator, at least one of the sine signal, the cosine signal, the sine signal after correction, or the cosine signal after correction, which is used for calculating the rotation angle is one in which a $(2q-1)$th order (where, q is a natural number) signal error is corrected.

13. The angle detection device according to claim 12,
wherein the angle calculator corrects the signal error by a previous rotation angle value.

14. The angle detection device according to claim 12,
wherein the angle calculator corrects the signal error by an estimated rotation angle based on a previous rotation angle value.

15. An angle detection device comprising:
a ring-shaped sensor magnet configured to rotate integrally with a rotating shaft centering on the rotating shaft, and to generate a magnetic field for angle detection that is for detecting the angle of rotation;
a first sensor and a second sensor each configured to be arranged on a surface opposite to the sensor magnet at a position separated in angle by 90 degrees on a circumference centered on the rotating shaft, a distance from a center of the rotating shaft to the first sensor and the second sensor being smaller than a distance from the center of the rotating shaft to an outer radial edge of the sensor magnet, and to output a signal corresponding to the magnetic field for angle detection; and an angle calculator configured to calculate a rotation angle by using the signals from the first sensor and the second sensor, wherein the angle calculator calculates the rotation angle from output information of the other sensor when one of the sensors fails, and calculates a rotation angle after m time correction (where, m is a natural number) by correcting a 2nth order (where, n is a natural number) angle error with respect to the rotation angle.

16. An electric power steering apparatus comprising:
the angle detection device as set forth in claim 15; and
an AC rotary machine configured to generate assist torque that is for assisting driver's steering.

\* \* \* \* \*